US012249446B2

(12) United States Patent
Watanabe

(10) Patent No.: US 12,249,446 B2
(45) Date of Patent: Mar. 11, 2025

(54) VARIABLE RESISTOR

(71) Applicant: Fujikura Ltd., Tokyo (JP)

(72) Inventor: Masami Watanabe, Chiba (JP)

(73) Assignee: Fujikura Ltd., Tokyo (JP)

( * ) Notice: Subject to any disclaimer, the term of this patent is extended or adjusted under 35 U.S.C. 154(b) by 358 days.

(21) Appl. No.: 17/792,945

(22) PCT Filed: Mar. 25, 2021

(86) PCT No.: PCT/JP2021/012693
§ 371 (c)(1),
(2) Date: Jul. 14, 2022

(87) PCT Pub. No.: WO2021/205899
PCT Pub. Date: Oct. 14, 2021

(65) Prior Publication Data

US 2023/0050844 A1 Feb. 16, 2023

(30) Foreign Application Priority Data

Apr. 10, 2020 (JP) ................................ 2020-071142

(51) Int. Cl.
*H01C 10/44* (2006.01)
*H01C 1/022* (2006.01)

(52) U.S. Cl.
CPC ............. *H01C 10/44* (2013.01); *H01C 1/022* (2013.01)

(58) Field of Classification Search
CPC ................................ H01C 10/44; H01C 1/022
See application file for complete search history.

(56) References Cited

U.S. PATENT DOCUMENTS 4,333,068 A * 6/1982 Kishel .................... H01C 10/08 338/202
4,479,392 A * 10/1984 Froeb ........................ G01L 1/14 341/20

(Continued)

FOREIGN PATENT DOCUMENTS

| | | |
|---|---|---|
| CN | 1277442 A | 12/2000 |
| JP | S58-064720 A | 4/1983 |

(Continued)

OTHER PUBLICATIONS

International Search Report issued in corresponding International Application No. PCT/JP2021/012693 mailed Jun. 22, 2021 (6 pages).

*Primary Examiner* — Kyung S Lee
(74) *Attorney, Agent, or Firm* — Osha Bergman Watanabe & Burton LLP

(57) ABSTRACT

A variable resistor includes: a first substrate having a first main surface; a resistor disposed on the first main surface; a first wiring pattern disposed on the first main surface and connected to the resistor; a spacer having an opening; a second substrate that: has second and third main surfaces, and is disposed on the first substrate via the spacer such that the second main surface is opposed to the first main surface; a connecting body that is: disposed on the second main surface such that the connecting body is disposed in the opening, and configured to electrically connect to the resistor by pushing of a pusher from the third main surface; and a second wiring pattern. A resistance value between the first wiring pattern and the second wiring pattern is changed based on a pushing position of the pusher.

10 Claims, 17 Drawing Sheets

(56) References Cited

U.S. PATENT DOCUMENTS

| | | | | | |
|---|---|---|---|---|---|
| 4,651,123 | A * | 3/1987 | Zepp | H01C 10/10 | 338/176 |
| 4,746,894 | A * | 5/1988 | Zeldman | H01C 10/08 | 901/33 |
| 5,334,967 | A * | 8/1994 | Paszkiewicz | H01C 10/08 | 338/96 |
| 9,514,866 | B2 * | 12/2016 | Huang | H01C 10/10 | |
| 10,249,416 | B2 * | 4/2019 | Huang | H01C 1/01 | |
| 10,547,257 | B2 * | 1/2020 | Kong | H01C 10/30 | |
| 2017/0154712 | A1 | 6/2017 | Huang et al. | | |

FOREIGN PATENT DOCUMENTS

| | | | |
|---|---|---|---|
| JP | S60-054303 | U | 4/1985 |
| JP | 2007-035930 | A | 2/2007 |
| JP | 2010-146802 | A | 7/2010 |

* cited by examiner

VARIABLE RESISTOR

CROSS REFERENCE TO RELATED APPLICATIONS

This application is a national stage of International Patent Application No. PCT/JP2021/012693 and claims priority to Japanese Patent Application No. 2020-071142 filed on Apr. 10, 2020. The contents of these priority applications are incorporated herein by reference and regarded as a part of the description of this specification.

TECHNICAL FIELD

The present invention relates to a variable resistor.

BACKGROUND

Conventional variable resistor includes a first wiring board on which a first resistor layer is disposed, a second wiring board on which a current passage layer is disposed so that the current passage layer faces the first resistor layer, and a spacer supporting the first and second wiring boards in parallel spaced apart at predetermined intervals, a pushing operation is applied by a pusher from the outer surface of the second wiring board at any position along the longitudinal direction of the first resistor layer, and the circuit resistance length is arbitrarily set by partially contacting the first resistor layer and the current passage layer (see, for example, Patent document 1).

PATENT DOCUMENT

Patent document 1: JP 2010-146802 A

In the above-mentioned variable resistor, since the pusher is slid in a state where the first resistor layer and the current passage layer directly contact each other, the first resistor layer may be worn and conduction failure may occur.

One or more embodiments of the present invention provide a variable resistor capable of suppressing the occurrence of conduction failure.

SUMMARY

[1] A variable resistor according to one or more embodiments of the present invention is a variable resistor including: a first substrate having a first main surface; a resistor disposed on the first main surface; a first wiring pattern disposed on the first main surface and connected to the resistor; a spacer having an opening; a second substrate having second and third main surfaces and laid on the first substrate via the spacer so that the second main surface is opposed to the first main surface; a connecting body disposed on the second main surface so that the connecting body is in the opening, the connection body being electrically connected to the resistor by pushing of a pusher from the third main surface; and a second wiring pattern disposed on the first main surface and electrically connected to the connecting body by pushing of the pusher, or disposed on the second main surface and connected to the connecting body; in which, in a plan view, the connecting body has a non-overlap region that does not overlap with the resistor, in a plan view, a pushing region in which the pusher can push is included in the non-overlap region, and a resistance value between the first wiring pattern and the second wiring pattern is changed based on a pushing position of the pusher.

[2] In one or more embodiments, the second wiring pattern may be disposed on the first main surface and may be arranged to be spaced apart from the resistor, in plan view, the connecting body may partially overlap with the resistor and may partially overlaps with the second wiring pattern, in plan view, the pushing region may be set between the resistor and the second wiring pattern, and the connecting body may contact the resistor and the second wiring pattern by pushing of the pusher from the third main surface.

[3] In one or more embodiments, in plan view, one edge of the connecting body may overlap with the resistor over a whole area of the connecting body along the extending direction of the resistor, and in plan view, another edge of the connecting body may overlap with the second wiring pattern over a whole area of the connecting body along the extending direction of the resistor.

[4] In one or more embodiments, the variable resistor may further include first comb tooth patterns disposed on the first main surface and connected to the resistor, in plan view, the first comb tooth patterns may overlap with the pushing region, and a material of which the resistor is made may have an electrical resistivity higher than an electrical resistivity of a material of which the first comb tooth patterns are made.

[5] In one or more embodiments, the second wiring pattern may be disposed on the first main surface, the variable resistor may further include second comb tooth patterns disposed on the first main surface and connected to the second wiring pattern, in plan view, the second comb tooth patterns may overlap with the pushing region, a material of which the resistor is made may have an electrical resistivity higher than an electrical resistivity of a material of which the second comb tooth patterns are made, and the connecting body may contact the first comb tooth pattern and the second comb tooth pattern by pushing of the pusher from the third main surface.

[6] In one or more embodiments, the variable resistor may further include the pusher, the first comb tooth patterns and the second comb tooth patterns may be arranged alternately and substantially at equal intervals along an extending direction of the connecting body in the pushing region, and a pushing portion of the pusher that contacts the third surface may have a dimension larger than a pitch of the first comb tooth patterns adjacent to each other via the second comb tooth pattern in a direction in which the first and second comb tooth patterns are arranged.

[7] In one or more embodiments, the second wiring pattern may be disposed on the first main surface, in plan view, the connecting body may partially overlap with the second wiring pattern, and the connecting body may contact the first comb tooth patterns and the second wiring pattern by pushing of the pusher from the third main surface.

[8] In one or more embodiments, in plan view, an edge of the connecting body may overlap with the second wiring pattern over a whole area of the connecting body along the extending direction of the resistor.

[9] In one or more embodiments, the second wiring pattern may be disposed on the second main surface and may be connected to the connecting body, the connecting body may contact the first comb tooth pattern by pushing of the pusher from the third main surface.

[10] In one or more embodiments, the variable resistor may further include the pusher, the first comb tooth patterns may be arranged substantially at equal intervals along an extending direction of the connecting body in the pushing region, and a pushing portion of the pusher that contacts the third surface may have a dimension larger than a pitch of the first comb tooth patterns adjacent to each other in a direction in which the first comb tooth patterns are arranged.

[11] In one or more embodiments, the variable resistor may further include: a third wiring pattern connected to the resistor; a third comb tooth pattern connected to the first wiring pattern; and a fourth comb tooth pattern connected to the third wiring pattern, and, in a plan view, the third and fourth comb tooth patterns may overlap with the pushing region.

[12] In one or more embodiments, the spacer may cover a whole of the resistor.

[13] In one or more embodiments, the variable resistor may further include a resin layer covering at least a part of the resistor, and at least one of the resin layer and the spacer may cover a whole of the resistor.

[14] In one or more embodiments, the variable resistor may further include the pusher, and the resistor may have a width narrower than a width of a pushing portion of the pusher that contacts the third main surface.

[15] In one or more embodiments, the resistor may be formed by printing and curing a carbon paste.

[16] In one or more embodiments, the second wiring pattern may include: a first main body disposed on the first or second main surface, and a first protective layer covering a region of the first main body corresponding to the resistor, and a material of which the resistor is made may have an electrical resistivity higher than an electrical resistivity of a material of which the first main body is made.

[17] In one or more embodiments, the connecting body may include: a second main body disposed on the second main surface, and a second protective layer covering the second main body, and a material of which the resistor is made may have an electrical resistivity higher than an electrical resistivity of a material of which the second main body is made.

[18] In one or more embodiments, the variable resistor may further include a third wiring pattern disposed on the first main surface, one end of the resistor may cover an end of the first wiring pattern, another end of the resistor may cover an end of the third wiring pattern, and a material of which the resistor is made may have an electrical resistivity higher than an electrical resistivity of a material of which the third wiring pattern body is made.

[19] In one or more embodiments, the first and third wiring patterns may apply a predetermined voltage to the resistor, and the second wiring pattern may output a voltage based on the pushing position of the pusher.

[20] In one or more embodiments, the variable resistor may further include the pusher, and the pusher may be able to push the third main surface at an arbitrary position along an extending direction of the connecting body.

[21] In one or more embodiments, the variable resistor may further include the pusher, and the pusher may be a slider that can slide along an extending direction of the resistor while pushing the third main surface.

According to one or more embodiments of the present invention, in a plan view, the connecting body has a non-overlap region that does not overlap with the resistor, and the pushing region in which the pusher can push is included in the non-overlap region. Therefore, it is possible to suppress the wear of the resistor due to the sliding of the pusher, and it is possible to suppress the occurrence of conduction failure of the variable resistor.

DETAILED DESCRIPTION

Embodiments of the present invention will be described below with reference to the drawings.

Figure 1:
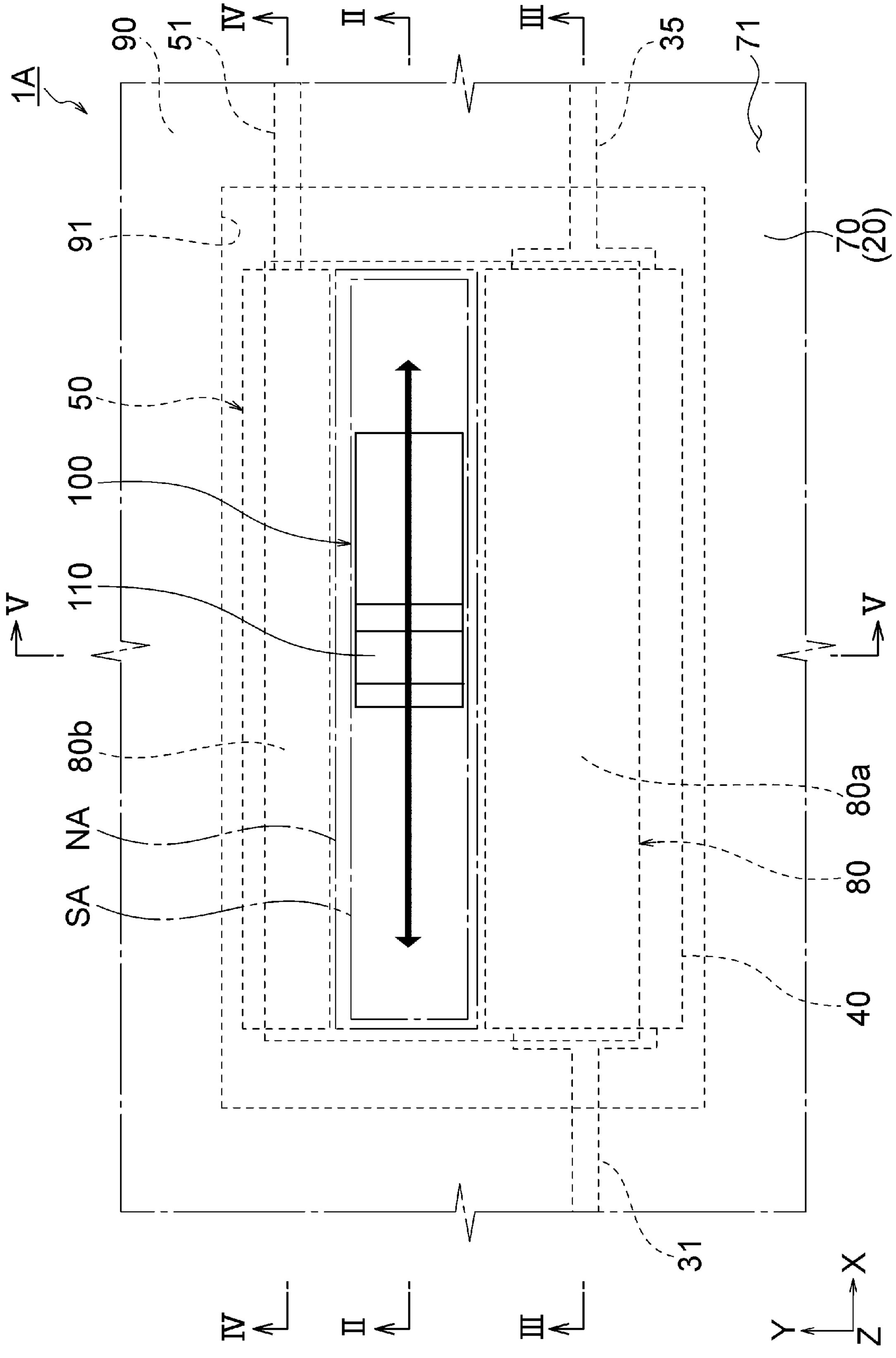
FIG. 1 is a plan view showing the variable resistor according to one or more embodiments of the present invention.
Figure 2:
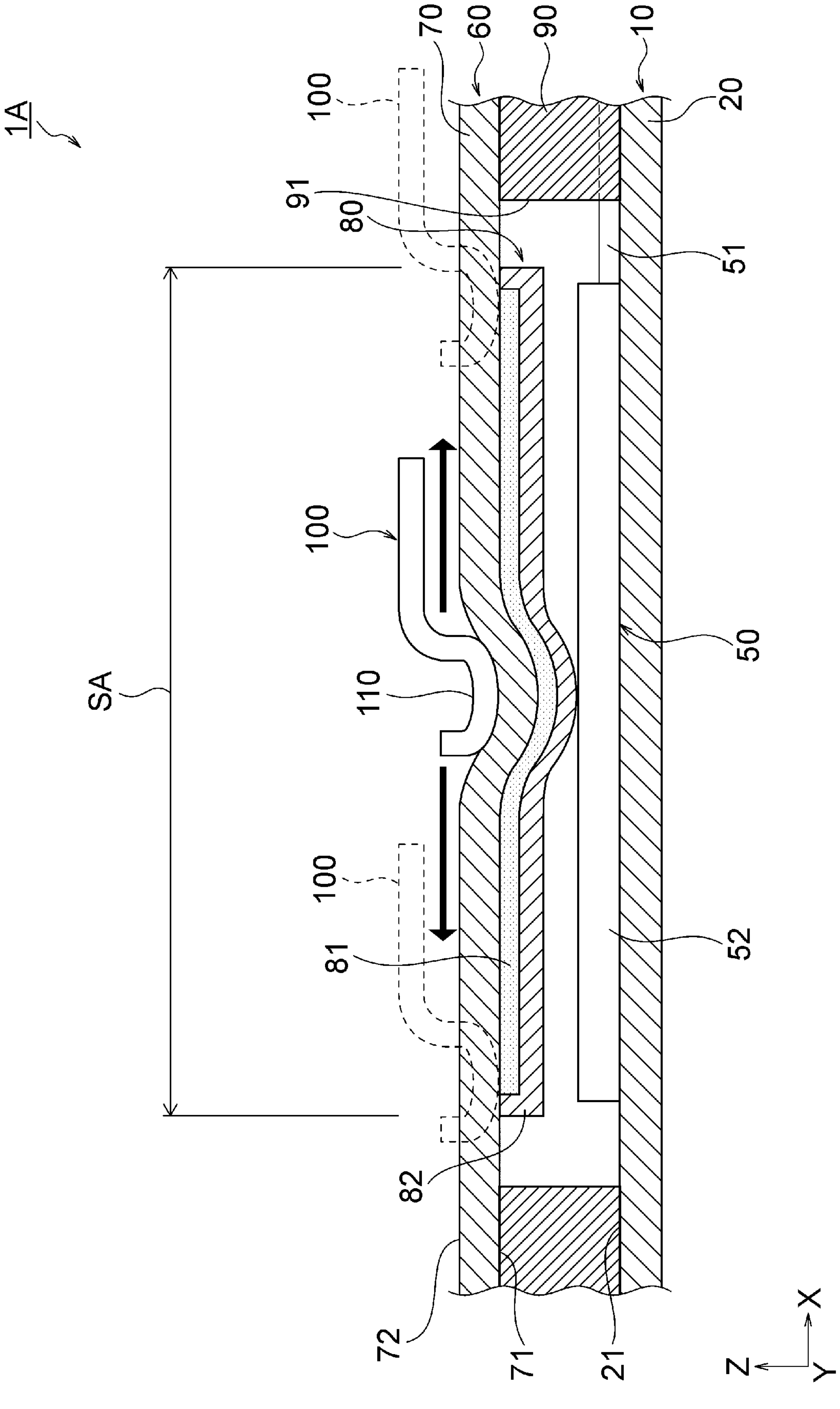
FIG. 2 is a cross-sectional view taken along the line II-II line of FIG. 1.
Figure 3:
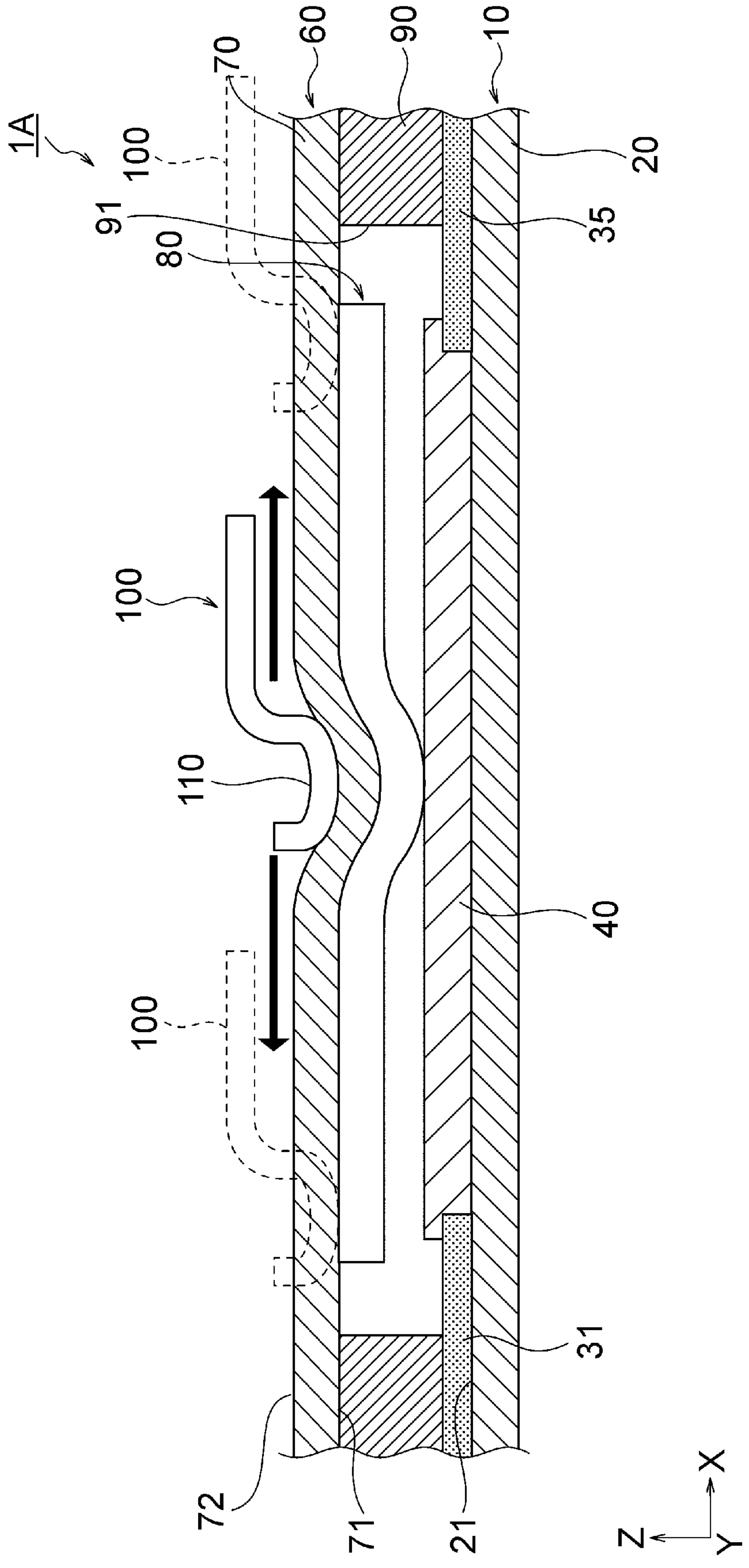
FIG. 3 is a cross-sectional view taken along the line III-III line of FIG. 1.
Figure 4:
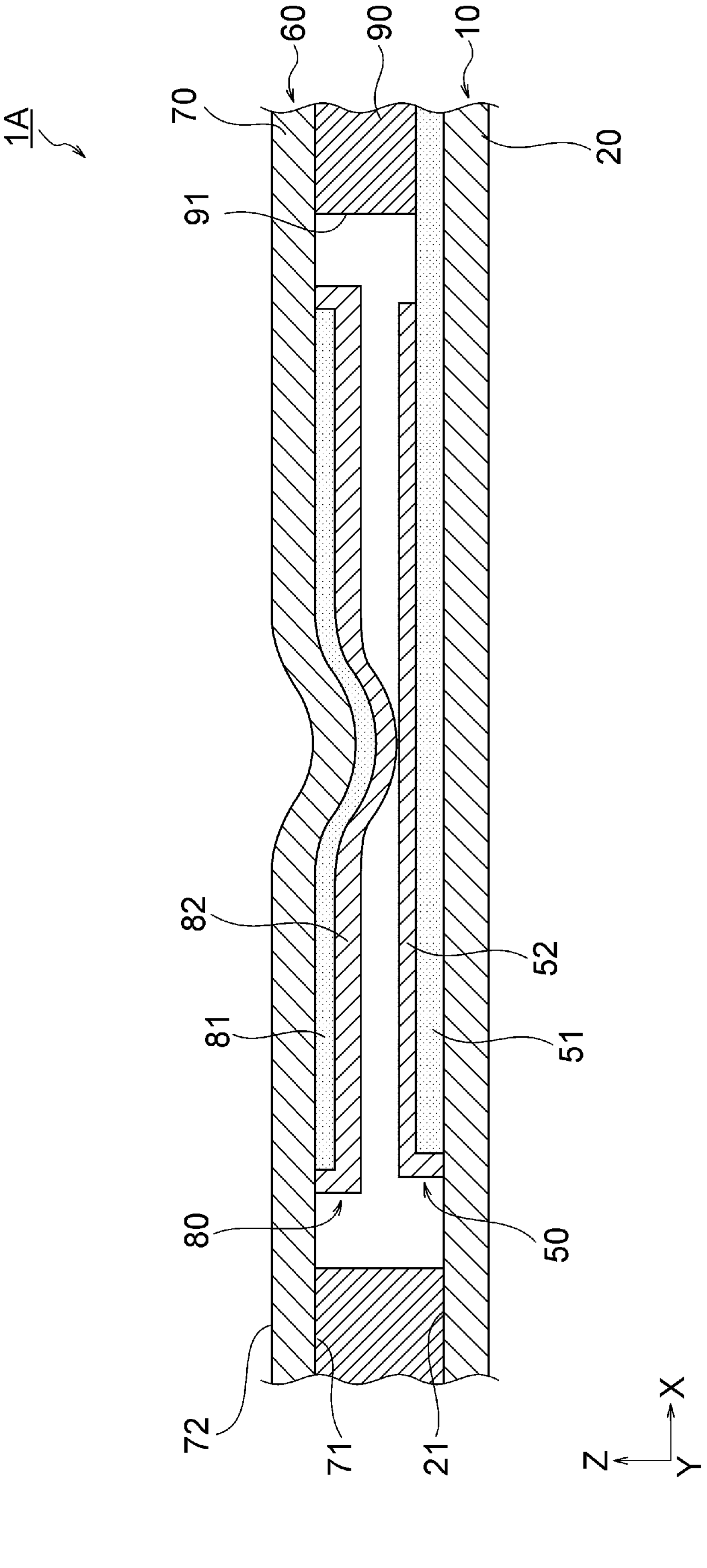
FIG. 4 is a cross-sectional view taken along the line IV-IV of FIG. 1.
Figure 5:
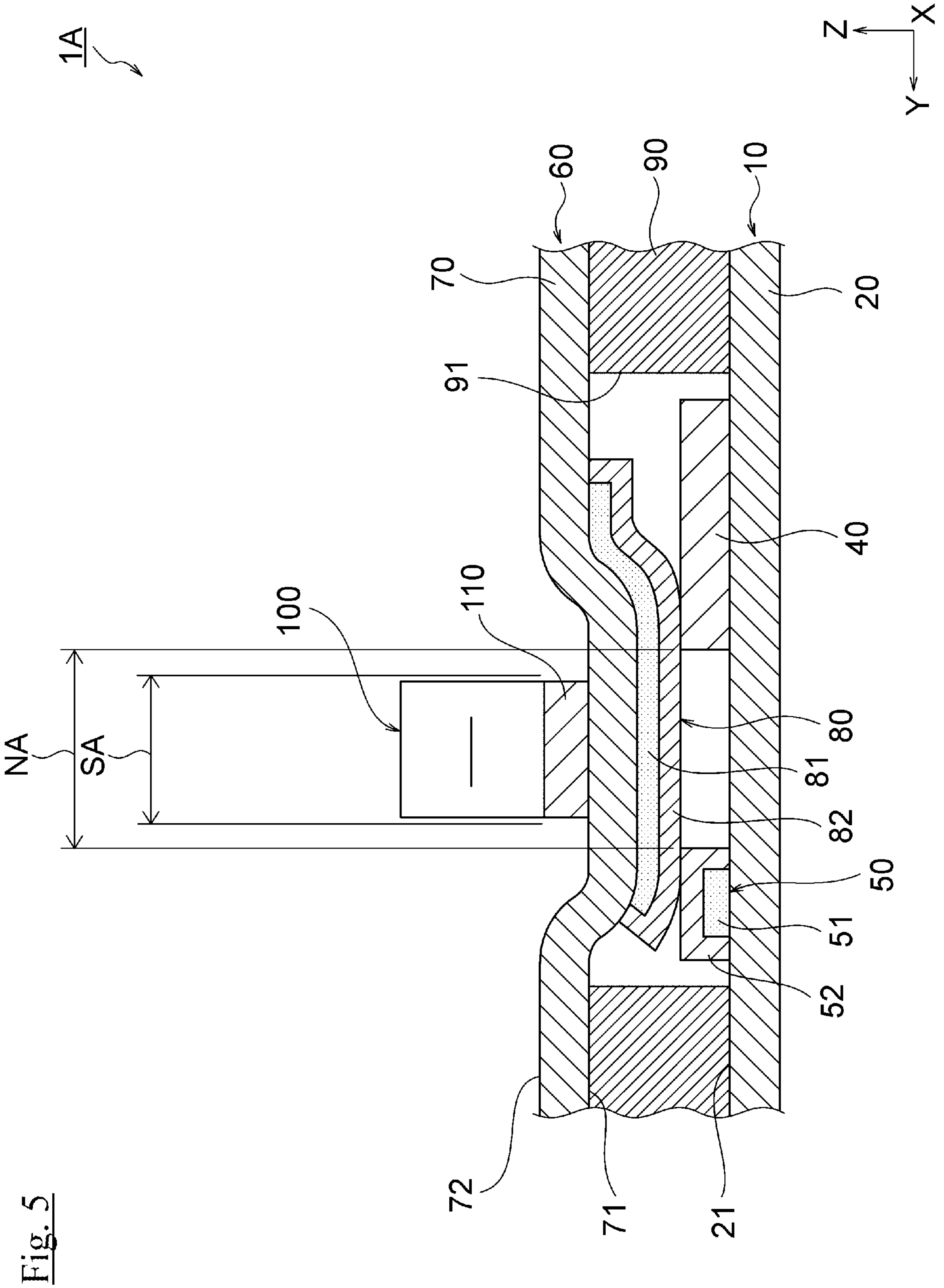
FIG. 5 is a cross-sectional view taken along the line V-V in FIG. 1.
Figure 6:
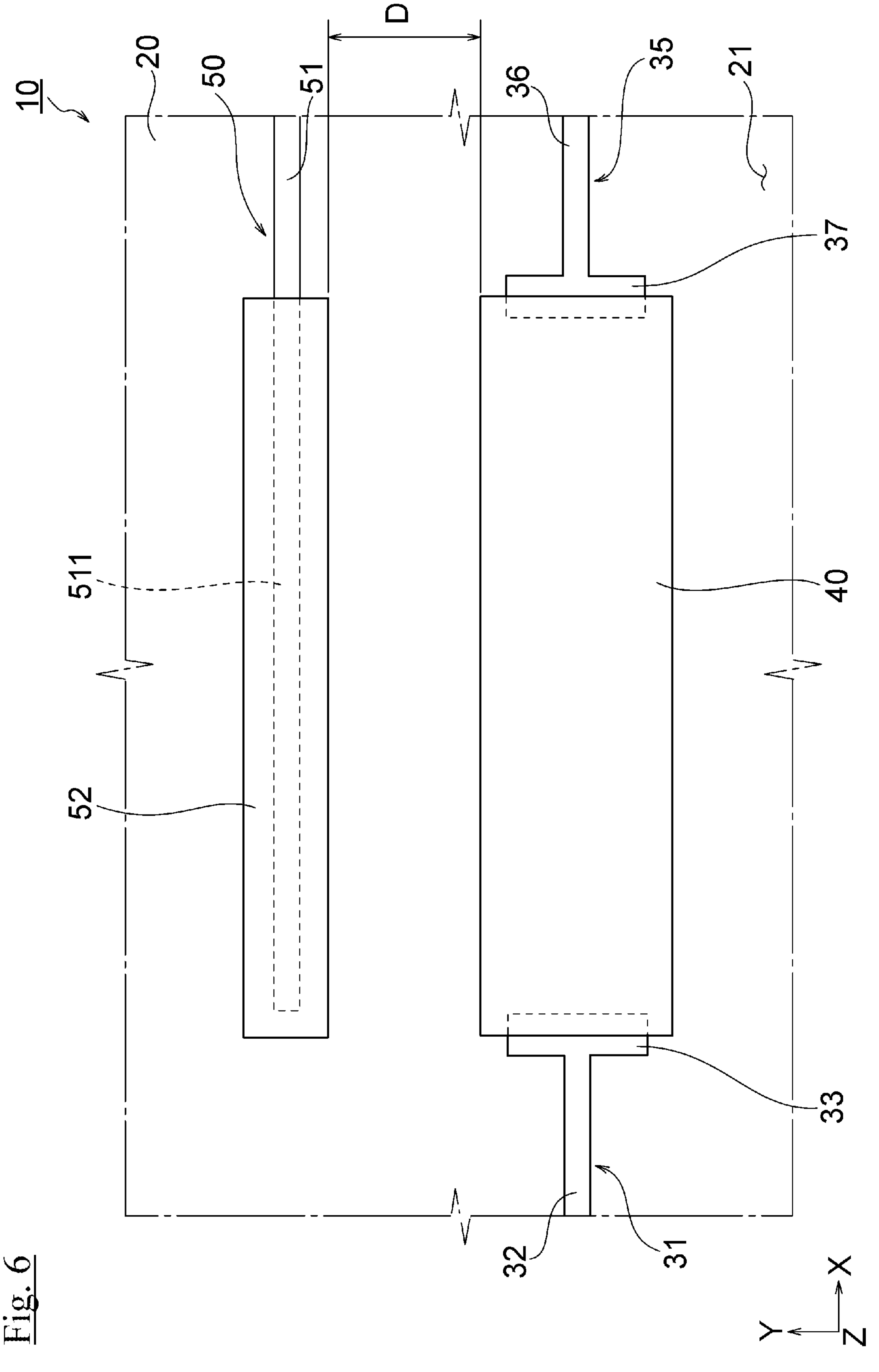
FIG. 6 is a plan view showing the lower membrane board according to one or more embodiments of the present invention.
Figure 7:
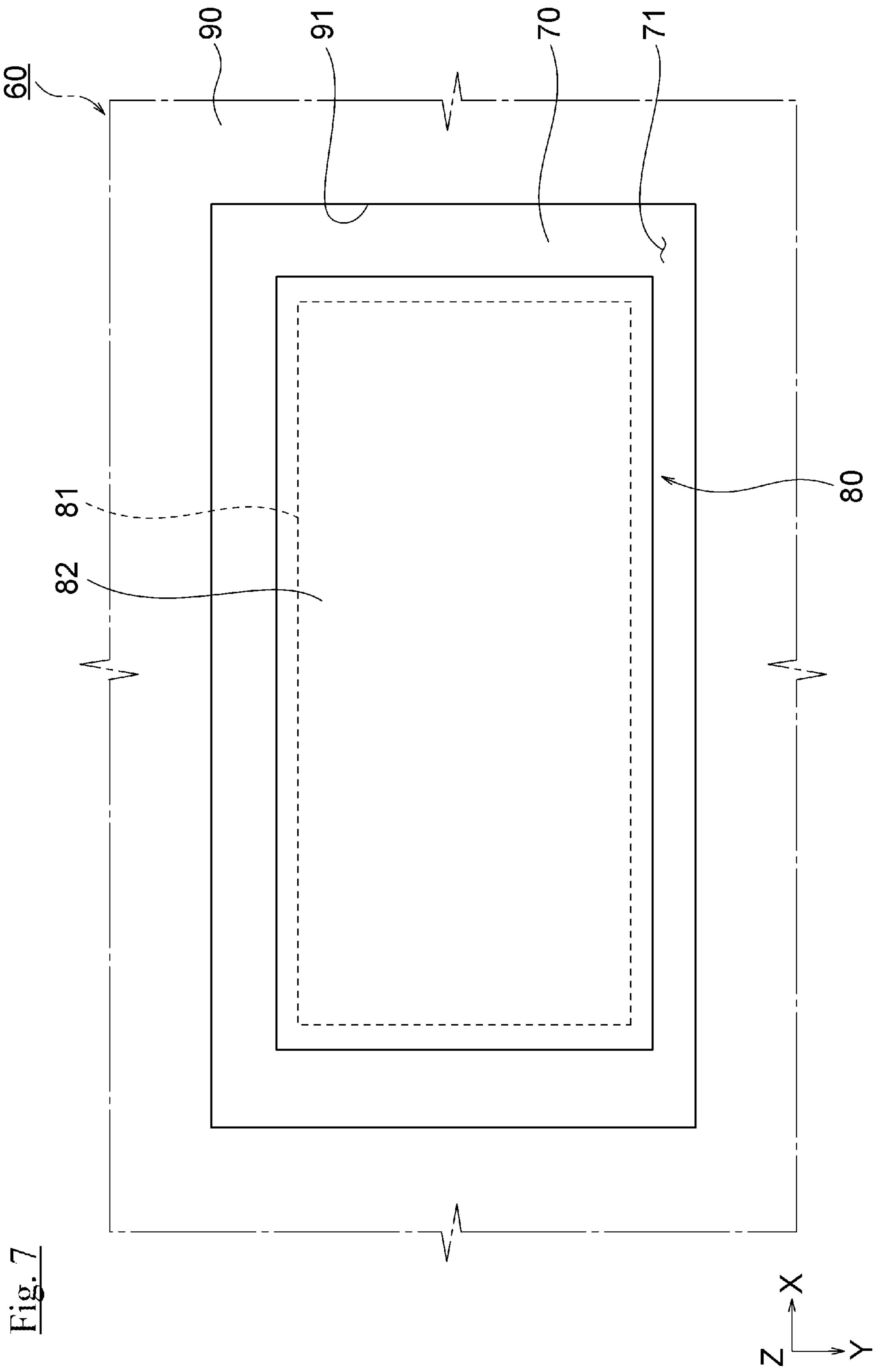
FIG. 7 is a bottom view showing the spacer and the upper membrane board according to one or more embodiments of the present invention.

FIG. 1 is a plan view showing the variable resistor according to one or more embodiments of the present invention, FIG. 2 is a cross-sectional view taken along the line II-II line of FIG. 1, FIG. 3 is a cross-sectional view taken along the line III-III line of FIG. 1, FIG. 4 is a cross-sectional view taken along the line IV-IV of FIG. 1, and FIG. 5 is a cross-sectional view taken along the line V-V in FIG. Further, FIG. 6 is a plan view showing the lower membrane board according to one or more embodiments of the present invention, and FIG. 7 is a bottom view showing the spacer and the upper membrane board according to one or more embodiments of the present invention.

As shown FIGS. 1 to 5, the variable resistor 1A of one or more embodiments includes a lower membrane board 10, an upper membrane board 60, a spacer 90, and a slider 100. The variable resistor 1A in one or more embodiments corresponds to an example of the "variable resistor" in the present invention, the spacer 90 in one or more embodiments corresponds to an example of the "spacer" in the present invention, and the slider 100 in one or more embodiments corresponds to an example of the "pusher" in the present invention.

The lower membrane board 10 includes a resistor 40 and a wiring pattern 50. On the other hand, the upper membrane board 60 includes a connecting body 80 that electrically connects the resistor 40 and the wiring pattern 50. These membrane board 10, 60 are laminated via a spacer 90, and the spacer 90 ensures a space between the membrane board 10, 60. The slider 100 is configured to slide while pushing on the upper membrane board 60. The resistor 40 and the wiring pattern 50 are electrically connected via the connecting body 80 by pushing of the slider 100.

Further, in the variable resistor 1A, the slider 100 slides while pushing the upper membrane board 60 to change the connection position between the connecting body 80 and the resistor 40, and it is possible to change the resistance length (the resistance value) of the resistor 40. Such applications of the variable resistor 1A, for example, variable resistor elements, position sensors, switches, encoders or the like can be exemplified. The application of the variable resistor 1 of one or more embodiments is not particularly limited to the above.

Hereinafter, the configuration of the variable resistor 1A of one or more embodiments will be described in detail.

As shown in FIG. 6, the lower membrane board 10 is a wiring board including a substrate 20, wiring patterns 31 and 35, a resistor 40, and a wiring pattern 50.

The substrate 20 in the present embodiment corresponds to an example of the "first substrate" in one or more embodiments of the present invention, and the resistor 40 in r corresponds to an example of the "resistor" in one or more embodiments of the present invention, and the wiring pattern 50 in the above corresponds to an example of the "second wiring pattern" in one or more embodiments of the present invention. Further, the wiring pattern 31 in the present embodiment corresponds to an example of the "first wiring pattern" in one or more embodiments of the present invention, and the wiring pattern 35 in the present embodiment corresponds to an example of the "third wiring pattern" in one or more embodiments of the present invention.

The substrate 20 is a film-like member made of a material having flexibility and electrical insulation. As the material constituting the substrate 20, for example, a resin material or the like can be exemplified, and more specifically, polyethylene terephthalate (PET) or polyethylene naphthalate (PEN) can be exemplified. The substrate 20 may not have flexibility.

The wiring patterns 31 and 35 are formed by printing a conductive paste on the upper surface 21 of the substrate 20 and solidifying (curing) the conductive paste. The conductive paste is constituted by mixing conductive particles and a binder resin with water or a solvent and various additives. The conductive paste constituting the wiring patterns 31 and 35 is a low resistance conductive paste having a relatively small electric resistance value. The method of forming the wiring patterns 31 and 35 is not particularly limited to the above. For example, instead of the conductive paste, the wiring patterns 31 and 35 may be formed by etching the metal foil.

As specific examples of the conductive material, silver, copper, nickel, tin, bismuth, zinc, indium, palladium and alloys thereof can be exemplified. As specific examples of the binder resin, acrylic resin, polyester resin, epoxy resin, vinyl resin, urethane resin, phenol resin, polyimide resin, silicone resin, fluororesin, or the like can be exemplified. As the solvent contained in the conductive paste, α-terpineol, butyl carbitol acetate, butyl carbitol, 1-decanol, butyl cell solve, diethylene glycol monoethyl ether acetate, and tetradecane, or the like can be exemplified.

Although not particularly limited, in one or more embodiments, as the low-resistance conductive paste, a silver paste containing silver as the main component of the conductive particles, or a copper paste containing copper as the main component of the conductive particles is used. As a conductive material, a metal salt may be used. As the metal salt, salts of the above-mentioned metals can be exemplified. The binder resin may be omitted from the above-mentioned conductive paste. Instead of the above-mentioned conductive paste, conductive ink may be used.

Although not particularly limited, either a contact coating method or a non-contact coating method may be used as the method for applying the conductive paste. As specific examples of the contact coating method, screen printing, gravure printing, offset printing, gravure offset printing, flexographic printing, or the like can be exemplified. On the other hand, as specific examples of the non-contact coating method, ink jet printing, spray coating, dispensing coating, jet dispensing, or the like can be exemplified. Although not particularly limited, as the heat source for curing the conductive paste, an electrothermal oven, an infrared oven, a far infrared oven (IR), a near infrared oven (NIR), a laser irradiation apparatus, or the like can be exemplified, and the heat source may be a heat treatment that combines these.

One wiring pattern 31 includes an extending portion 32 extending along the −X direction of the figure, and a wide portion 33 disposed at the end of the extending portion 32. The extending portion 32 and the wide portion 33 are integrally formed by printing the above-mentioned conductive paste on the upper surface 21 of the substrate 20 and curing the conductive paste. The wide portion 33 has a width wider than the width of the extending portion 32. As will be described later, the wide portion 33 is covered with the resistor 40.

Similarly, the other wiring pattern 35 also includes an extending portion 36 extending along the +X direction of the figure, and a wide portion 37 disposed at the end of the extending portion 36. The extending portion 36 and the wide portion 37 are integrally formed by printing the above-mentioned conductive paste on the upper surface 21 of the substrate 20 and curing the conductive paste. The wide portion 37 has a width wider than the width of the extending portion 36. As will be described later, the wide portion 37 is covered with the resistor 40. As long as the planar shape of the extending portions 32 and 36 of the wiring patterns 31 and 35 is linear, the planar shape is not limited to the straight linear shape as described above.

The wide portion 33 of one wiring pattern 31 and the wide portion 37 of the other wiring pattern 35 are arranged apart from each other along the X direction of the figure. The resistor 40 is disposed between the wide portions 33 and 37 and extends along the X direction of the figure. Similarly to the above-mentioned wiring patterns 31 and 35, the resistor 40 is also formed by printing a conductive paste on the upper surface 21 of the substrate 20 and curing the conductive paste.

The conductive paste constituting the resistor 40 is a high-resistance conductive paste having a high electrical resistance value as compared with the above-mentioned low-resistance conductive paste. The conductive paste constituting the resistor 40 contains conductive particles having an electrical resistivity higher than the electrical resistivity of the conductive particles of the conductive paste constituting the above-mentioned wiring patterns 31 and 35. That is, the resistor 40 is made of a material having the higher electrical resistivity than the electrical resistivity of the material constituting the wiring patterns 31 and 35, and the resistance value of the resistor 40 is sufficiently higher than the resistance value of the wiring patterns 31 and 35 to the extent that the resistance value of the wiring patterns 31 and 35 can be ignored. Specifically, the resistance value of the resistor 40 is 10 times or more with respect to the resistance value of the wiring patterns 31 and 35, and may be 100 times or more with respect to the resistance value of the wiring patterns 31 and 35. The electrical resistivity of the material constituting the resistor 40 is 10 times or more, and may be 100 times or more, with respect to the electrical resistivity of the material constituting the wiring patterns 31 and 35.

As a specific example of such a high-resistance conductive paste, a carbon paste can be exemplified. As specific examples of the conductive particles contained in the conductive paste constituting the resistor 40, carbon-based materials such as graphite, carbon black (furnace black, acetylene black, Ketjenblack® (high conductive carbon black)), carbon nanotubes, carbon nanofibers, or the likes can be exemplified.

As described above, the resistor 40 covers the wide portion 33 of one wiring pattern 31 and covers the wide portion 37 of the other wiring pattern 35. The wiring patterns 31 and 35 are connected to each other by the resistor 40. Although not particularly shown, one wiring pattern 31 is connected to the power supply, while the other wiring pattern 35 is connected to the ground.

The wiring pattern 50 includes a first main body 51 and a first protective layer 52.

The first main body 51 is disposed on the upper surface 21 of the substrate 20. Similarly to the above-mentioned wiring patterns 31 and 35, the first main body 51 is formed by printing and curing the low-resistance conductive paste. That is, the first main body 51 is made of a material having the lower electrical resistivity than the electrical resistivity of the material constituting the resistor 40, and the resistance value of the resistor 40 is sufficiently higher than the resistance value of the first main body 51 to the extent that the resistance value of the first main body 51 can be ignored. Specifically, the resistance value of the resistor 40 is 10 times or more with respect to the resistance value of the first main body 51, and may be 100 times or more with respect to the resistance value of the first main body 51. The electrical resistivity of the material constituting the resistor 40 is 10 times or more, and may be 100 times or more, with respect to the electrical resistivity of the material constituting the first main body 51. The method of forming the first main body 51 is not particularly limited to the above. For example, instead of the conductive paste, the first main body 51 may be formed by etching the metal foil.

The first main body 51 extends along the X direction of the figure. The first main body 51 has a parallel portion 511 extending substantially parallel to the resistor 40 at its end. The planar shape of the first main body 51 is not particularly limited to the above.

The first protective layer 52 of the wiring pattern 50 is disposed on the upper surface 21 of the substrate 20 so that the first protective layer 52 covers the parallel portion 511 of the first main body 51. The first protective layer 52 is a layer that protects the parallel portion 511 of the first main body 51, and the first protective layer 52 is formed by printing and curing the high-resistance conductive paste has a high electric resistance value as compared with the above-mentioned low-resistance conductive paste. Although not particularly limited, as a specific example of such a high-resistance conductive paste, carbon paste can be exemplified. The first protective layer 52 has a length similar to the length of the resistor 40 along the X direction of the figure and is arranged at a predetermined distance D (see FIG. 6) from the resistor 40. That is, the first protective layer 52 of the wiring pattern 50 is arranged substantially parallel to the resistor 40. The wiring pattern 50 may not include the first protective layer 52.

As shown in FIG. 7, the second membrane board 60 is a wiring board including a substrate 70 and a connecting body 80. The substrate 70 in the present embodiment corresponds to an example of the "second substrate" in one or more embodiments of the present invention, and the connecting body 80 in the present embodiment corresponds to an example of the "connecting body" in one or more embodiments of the present invention.

Similarly to the above-mentioned substrate 20, the substrate 70 is a film-like member made of a material having flexibility and electrical insulation. As the material constituting the substrate 70, for example, a resin material or the like can be exemplified, and more specifically, polyethylene terephthalate (PET) or polyethylene naphthalate (PEN) can be exemplified. The material constituting the substrate 70 is not particularly limited to the above. The substrate 70 may be formed of a plate material made of a conductive material such as a metal material. In this case, the substrate 70 may also function as the connecting body 80. Further, when the wiring pattern 50 is formed on the substrate 70 as in one or more embodiments described later, the substrate 70 may also function as the wiring pattern 50. Even when the substrate 70 is formed of a plate material having conductivity, the connecting body 80 and the wiring pattern 50 may be formed on the substrate 70 separately from the substrate 70.

Similarly to the above-mentioned wiring pattern 50, the connecting body 80 includes a second main body 81 and a second protective layer 82. The connection body 80 may not include the second protective layer 82.

The second main body 81 is disposed on the lower surface 71 of the substrate 70. Similarly to the above-mentioned first main body 51 of the wiring pattern 50, the second main body 81 is formed by printing and curing the low-resistance conductive paste. That is, the second main body 81 is made of a material having the lower electrical resistivity than the electrical resistivity of the material constituting the resistor 40, and the resistance value of the resistor 40 is sufficiently higher than the resistance value of the second main body 81 to the extent that the resistance value of the second main body 81 can be ignored. Specifically, the resistance value of the resistor 40 is 10 times or more with respect to the resistance value of the second main body 81, and may be 100 times or more with respect to the resistance value of the second main body 81. The electrical resistivity of the material constituting the resistor 40 is 10 times or more, and may be 100 times or more, with respect to the electrical resistivity of the material constituting the second main body 81.

On the other hand, the second protective layer 82 is a layer that protects the second main body 81. Similarly to the above-mentioned first protective layer 52 of the wiring pattern 50, the second protective layer 82 is formed by printing and curing the high-resistance conductive paste. The second protective layer 82 is disposed on the lower surface 71 of the substrate 70 so that the protective layer 82 covers the entire of the second main body 81.

As shown in FIG. 1, the connecting body 80 is disposed on the lower surface 71 of the substrate 70 so that the connecting body 80 partially overlaps with the resistor 40 of the lower membrane board 10 and partially overlaps with the wiring pattern 50 of the lower membrane board 10 in plan view. More specifically, in one or more embodiments, the connecting body 80 has a rectangular planar shape having a width wider than the interval D. Then, the connecting body 80 is disposed on the lower surface 71 of the substrate 70 so that one edge (−Y side edge along the X direction of the FIG. 80*a* of the connecting body 80 overlaps with the resistor 40 and the other edge (+Y side edge along the X direction of the FIG. 80*b* of the connecting body 80 overlaps with the wiring pattern 50 in plan view.

Similarly to the above-mentioned substrate 20 and 70, the spacer 90 is a film-like member made of a material having flexibility and electrical insulation. As the material constituting the spacer 90, for example, a resin material or the like can be exemplified, and more specifically, polyethylene terephthalate (PET) or polyethylene naphthalate (PEN) can be exemplified.

As shown in FIGS. 1 to 5 and 7, the spacer 90 has an opening 91 having a rectangular planar shape. The opening 91 has a size that is larger than the connecting body 80 and can accommodate the connecting body 80. In one or more embodiments, the opening 91 has a size that can accommodate not only the connecting body 80 but also the resistor 40 and the wiring pattern 50. The opening 91 is formed in the spacer 90 so that the opening 91 accommodates the connecting body 80, the resistor 40, and the wiring pattern 50 when the membrane board 10 and 60 are laminated on each other via the spacer 90. As long as at least a part of the connecting body 80 is inside the opening 91 of the spacer 90, a part of the connecting body 80 may extend to the outside of the opening 91 and may be interposed between the spacer 90 and the substrate 70.

As described above, the membrane substrates 10 and 60 are laminated on each other via the spacer 90. As shown in FIGS. 2 to 5, the membrane substrates 10 and 60 are laminated so that the lower surface 71 of the substrate 70 of the upper membrane board 60 faces the upper surface 21 of the substrate 20 of the lower membrane board 10. Further, the substrate 20 of the lower membrane board 10 and the spacer 90 are bonded to each other via an adhesive layer (not shown), and the spacer 90 and the substrate 70 of the upper membrane board 60 are also bonded to each other via an adhesive layer (not shown).

As shown in FIG. 1, the connecting body 80, the resistor 40, and the wiring pattern 50 are included in the opening 91 in a plan view. Further, as shown in FIG. 1, in a plan view, one edge portion 80*a* of the connecting body 80 overlaps with the resistor 40 over the entire area of the connecting body 80 along the X direction of the figure, and, as shown in FIG. 5, the connecting body 80 and the resistor 40 partially face each other in the cross-sectional view. Similarly, as shown in FIG. 1, in a plan view, the other edge portion 80*b* of the connecting body 80 overlaps with the wiring pattern 50 over the entire area of the connecting body 80 along the X direction of the figure, and, as shown in FIG. 5, the connecting body 80 and the wiring pattern 50 partially face each other in the cross-sectional view. In one or more embodiments, as described above, a predetermined distance D is secured between the resistor 40 and the wiring pattern 50. Therefore, as shown in FIG. 1, the connecting body 80 has a non-overlap region NA that does not overlap with the resistor 40 and the wiring pattern 50 in a plan view.

As shown in FIGS. 2 to 5, the distance is ensured between the connection body 80 and the resistor 40 by the spacer 90, the distance is also ensured between the connecting body 80 and the wiring pattern 50 by the spacer 90. As will be described later, the substrate 20 of the upper membrane board 10 is deformed by pushing of the slider 100. By this deformation, the connecting body 80 and the resistor 40 contact each other and are electrically connected to each other, and the connecting body 80 and the wiring pattern 50 contact each other and are electrically connected to each other.

In one or more embodiments, although the thickness of the spacer 90 is set so that the connecting body 80 does not contact the resistor 40 and the wiring pattern 50 at the time of non-pushing, the thickness of the spacer 90 is not particularly limited to this. The thickness of the spacer 90 may be set so that the connecting body 80 contact with the resistor 40 and the wiring pattern 50 at all times.

In one or more embodiments, "electrically connecting" the connecting body and the resistor means a state where the resistance value between the connecting body and the resistor is equal to or less than a predetermined threshold value, and does not include a state where the connecting body and the resistor only contact each other at the time of non-pushing as described above. Similarly, in one or more embodiments, "electrically connecting" the connecting body and the wiring pattern means a state where the resistance value between the connecting body and the wiring pattern is equal to or less than a predetermined threshold value, and does not include a state where the connecting body and the wiring pattern only contact each other at the time of non-pushing as described above.

The slider 100 is a member having a half-cylindrical pushing portion 110 at its tip, and is made of, for example, a metal material. As long as the slider 100 can slide while pushing the upper surface 72 of the substrate 70 of the upper membrane board 60, the configuration of the slider 100 is not particularly limited to the above. Further, in one or more embodiments, since the object to be pushed by the slider 100 is not the resistor 40 but the upper surface 72 of the substate 70 of the upper membrane board 60, the slider 100 may be made of a material having electrical insulating properties such as a resin material. As will be described later, the operator's finger may be used instead of the slider 100.

The slider 100 is movably held by the housing (not shown) or the like in which the variable resistor 1A is housed. The slider 100 can reciprocate along the X direction (extending direction (longitudinal direction) of the connecting body 80) while maintaining the pushing force constant in a state where the pushing portion 110 is pushed against the upper surface 72 of the substrate 70 of the upper membrane board 60 with a predetermined pushing force. In one or more embodiments, as shown in FIG. 1, in a plan view, the sliding region SA in which the slider 100 can slide is set between the resistor 40 and the wiring pattern 50, is included in the non-overlap region NA of the connecting body 80 described above, and does not overlap with the resistor 40 and the wiring pattern 50. The slider 100 is allowed to reciprocate along the X direction of the figure in the sliding region SA. The sliding region SA in the present embodiment corresponds to an example of the "pushing region" in one or more embodiments of the present invention.

As shown in FIG. 5, pushing of the slider 100 causes the substrate 70 of the upper membrane board 60 to bend downward, the connecting body 80 comes into contact with the resistor 40 and the wiring pattern 50 respectively, and the resistor 40 and the wiring pattern 50 are electrically connected via the connecting body 80. Then, when the slider 100 slides while pushing the upper membrane substrate 60, the connection position between the connecting body 80 and the resistor 40 is changed, and the resistance length (resistance value) of the resistor 40 is changed.

Specifically, as described above, the power supply voltage (for example, 5 [V]) is applied to one of the wiring patterns 31 connected to the resistor 40, whereas the other wiring pattern 35 connected to the resistor 40 is grounded. Further, the wiring pattern 50 is always electrically connected to the resistor 40 via the connecting body 80 by pushing of the slider 100, and the wiring pattern 50 is electrically connected with the resistor 40 at an arbitrary position in the X direction of the figure. Therefore, the wiring pattern 50 detects a voltage (detection voltage) corresponding to the pushing position of the slider 100. That is, in one or more embodiments, the resistance value between the wiring patterns 31 and 50 is changed in accordance with the pushing position of the slider 100. A multimeter (not shown) or the like is connected to the wiring patterns 31 and 50 of the variable resistor 1A, and the multimeter or the like outputs the electric potential difference between the power supply voltage and the detection voltage of the wiring pattern 50.

For example, when the slider 100 is located at the left end of FIG. 2 in the sliding region SA, since the connection position of the connecting body 80 in the resistor 40 is also located at the left end, the wiring pattern 50 detects a voltage of substantially the same potential as the power supply voltage, and the electric potential difference (for example, 0 [V]) between the power supply voltage and the detected voltage of the wiring pattern 50 is output by a multimeter or the like.

On the other hand, as shown in FIG. 2, when the slider 100 is located substantially at the center in the sliding region SA, since the connection position of the connecting body 80 in the resistor 40 is also located substantially at the center, the wiring pattern 50 detects the voltage having a potential of substantially half of the power supply voltage, and the electric potential difference (for example, 2.5 [V]) between the power supply voltage and the detected voltage of the wiring pattern 50 is output by a multimeter or the like.

Further, when the slider 100 is located at the right end of FIG. 2 in the sliding region SA, since the connection position of the connecting body 80 in the resistor 40 is also located at the right end, the wiring pattern 50 detects a voltage of substantially the same potential as ground, and the electric potential difference (for example, 5 [V]) between the power supply voltage and the detected voltage of the wiring pattern 50 is output by a multimeter or the like.

As described above, in one or more embodiments, the connecting body 80 is disposed on the lower surface 71 of the substrate 70 of the upper membrane board 60, the slider 100 pushes the upper surface 72 of the substrate 70, and the resistor 40 and the wiring pattern 50 disposed on the upper surface 21 of the substrate 20 of the lower membrane board 10 are electrically connected via the connecting body 80 by pushing of the slider 100. That is, the substrate 70 of the upper membrane board 60 is interposed between the slider 100 and the resistor 40, and the slider 100 is not in direct contact with the resistor 40.

Further, in one or more embodiments, the sliding region SA in which the slider 100 slides is set between the resistor 40 and the wiring pattern 50 in a plan view. That is, there is not the resistor 40 immediately below the sliding region SA of the slider 100.

Therefore, in one or more embodiments, since it is possible to suppress wear of the resistor 40 due to sliding of the slider 100, it is possible to suppress the occurrence of conduction failure of the variable resistor 1A.

Further, in one or more embodiments, since all of the wiring patterns 31, 35, and 50 to be connected to the outside are disposed on the upper surface 21 of the same substrate 20, it is sufficient to implement a connector only on the upper surface 21, and it is possible to simplify the configuration of the variable resistor 1A.

Figure 8:
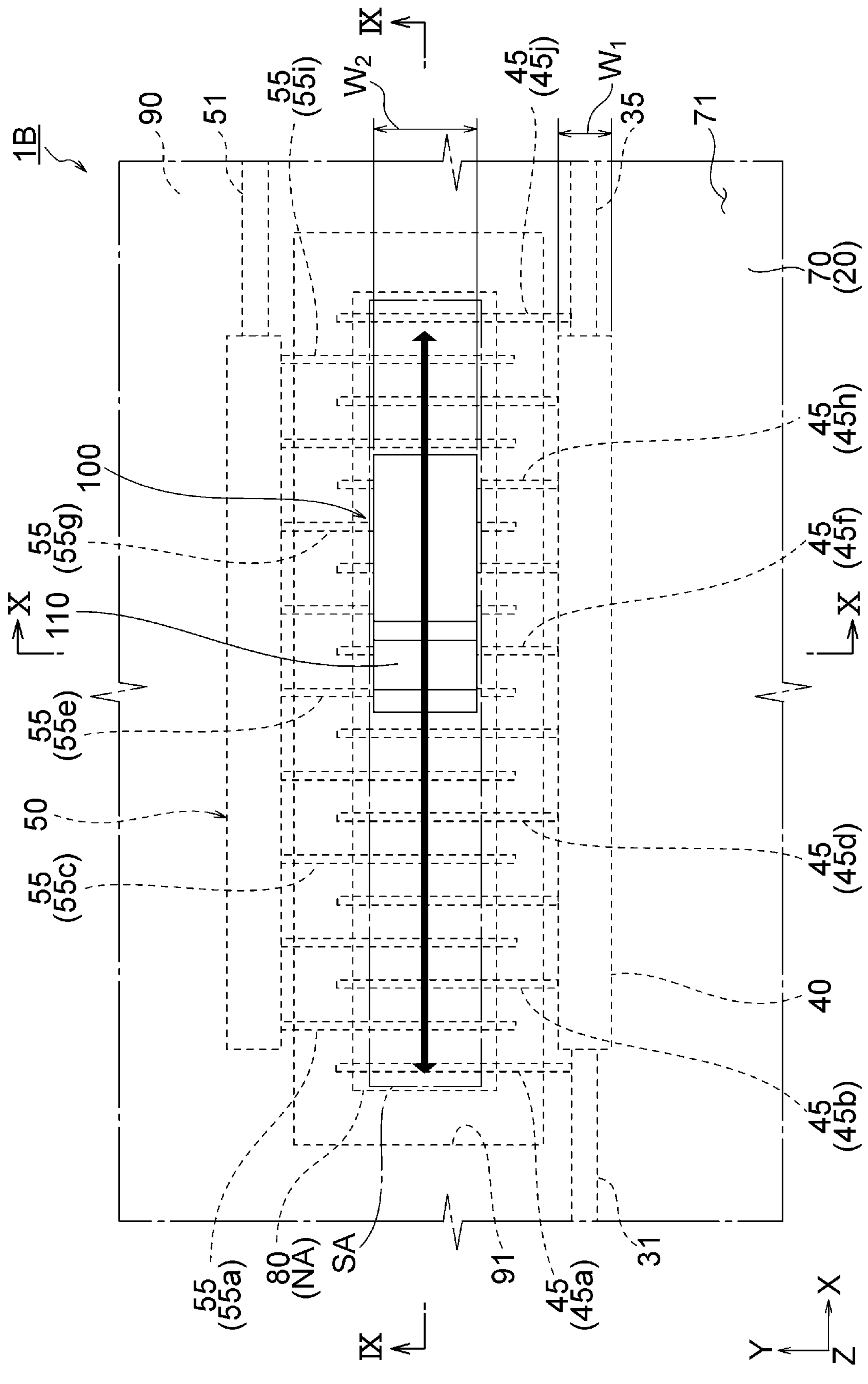
FIG. 8 is a plan view showing the variable resistor according to one or more embodiments of the present invention.
Figure 9:
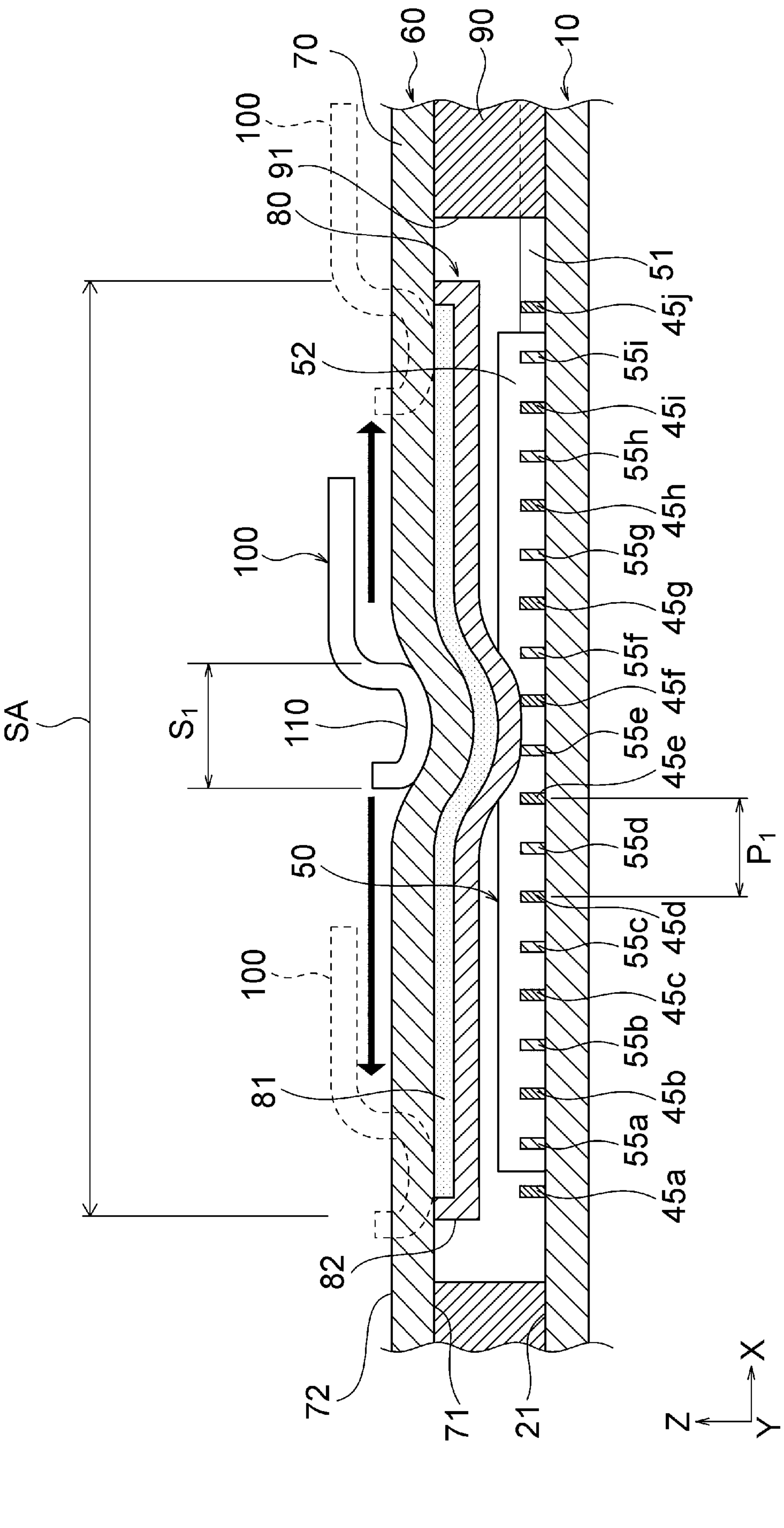
FIG. 9 is a cross-sectional view showing the line IX-IX of FIG. 8.
Figure 10:
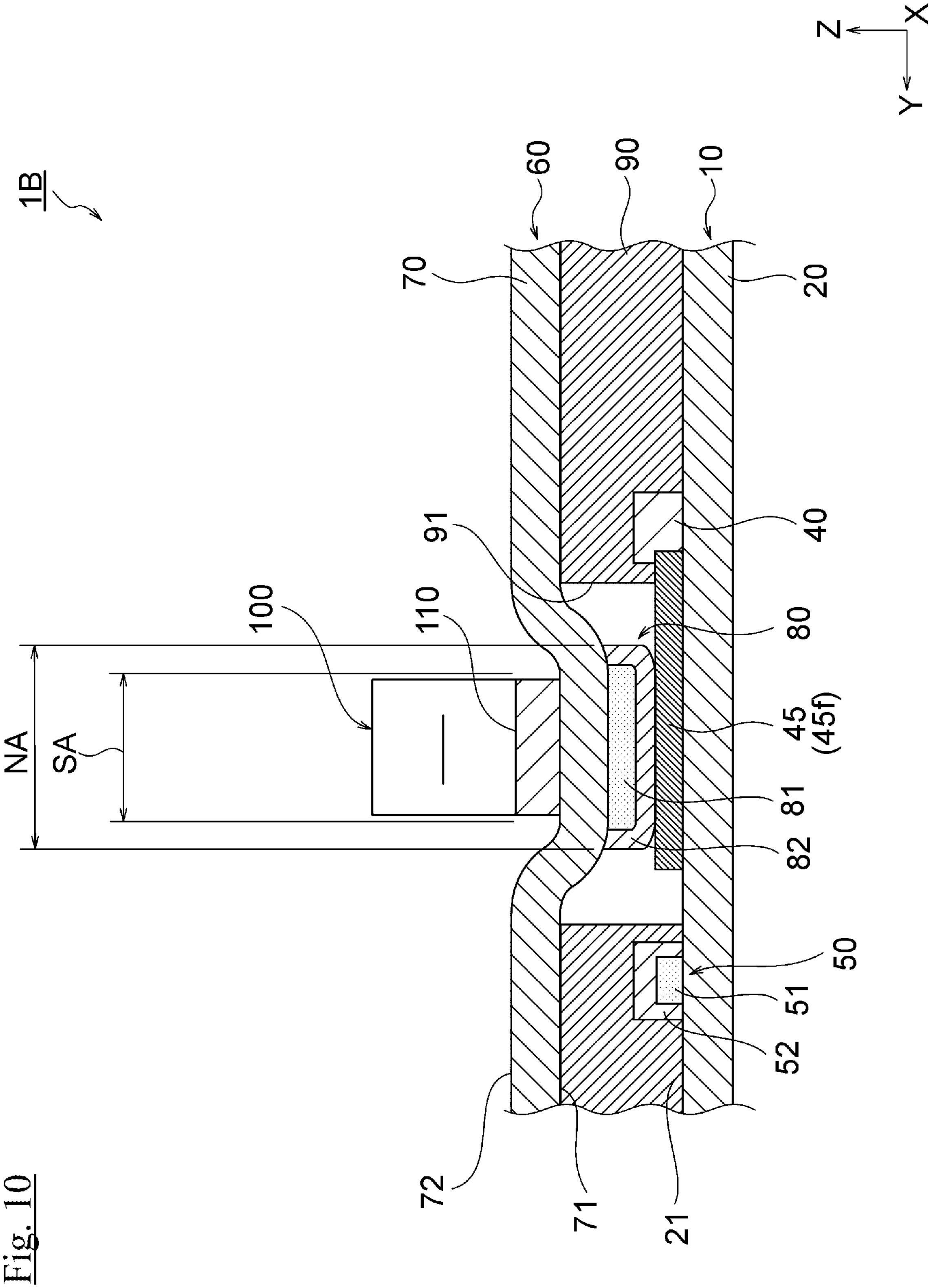
FIG. 10 is a cross-sectional view taken along the line X-X of FIG. 8.
Figure 11:
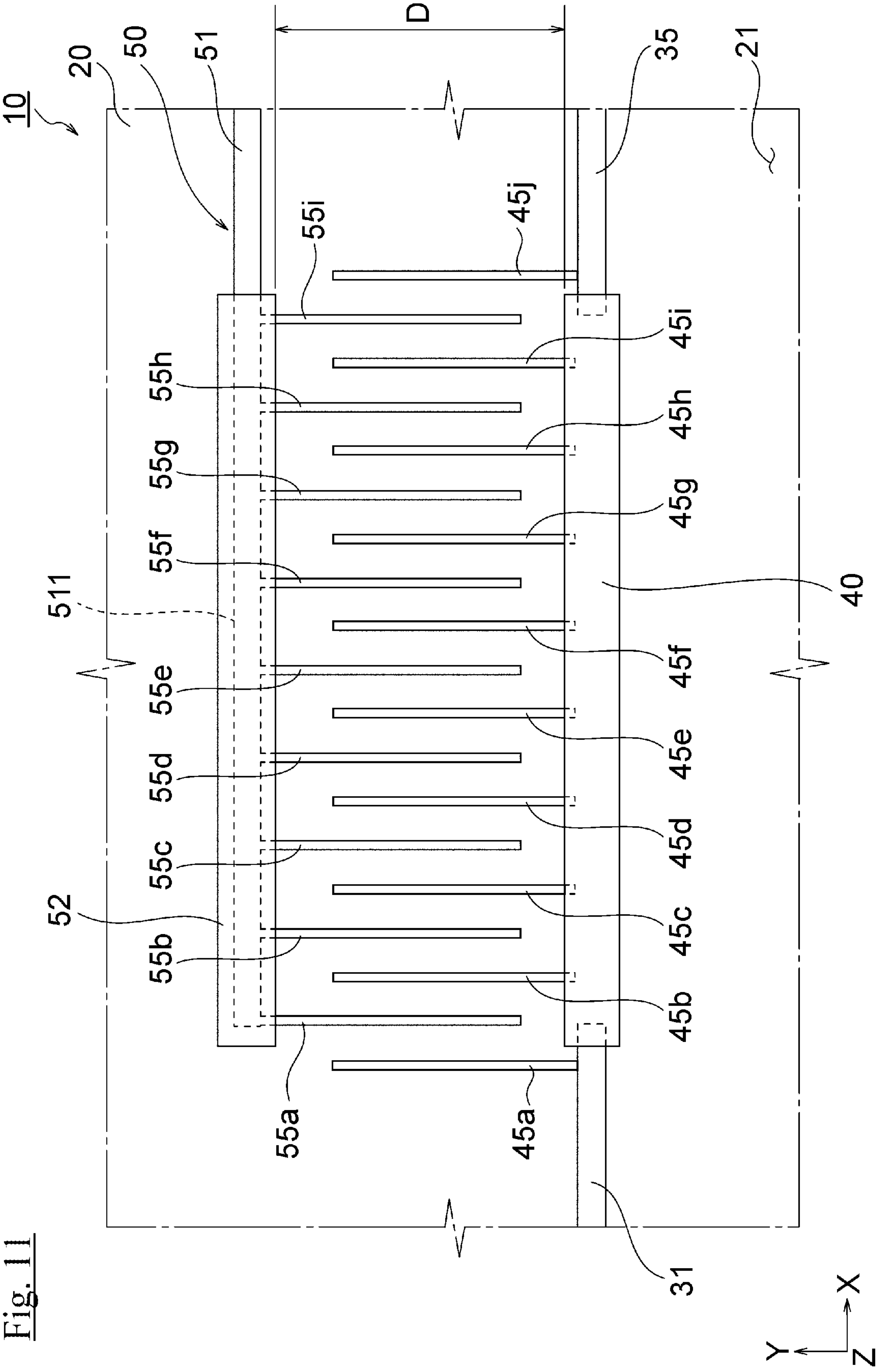
FIG. 11 is a plan view showing the lower membrane board according to one or more embodiments of the present invention.
Figure 12:
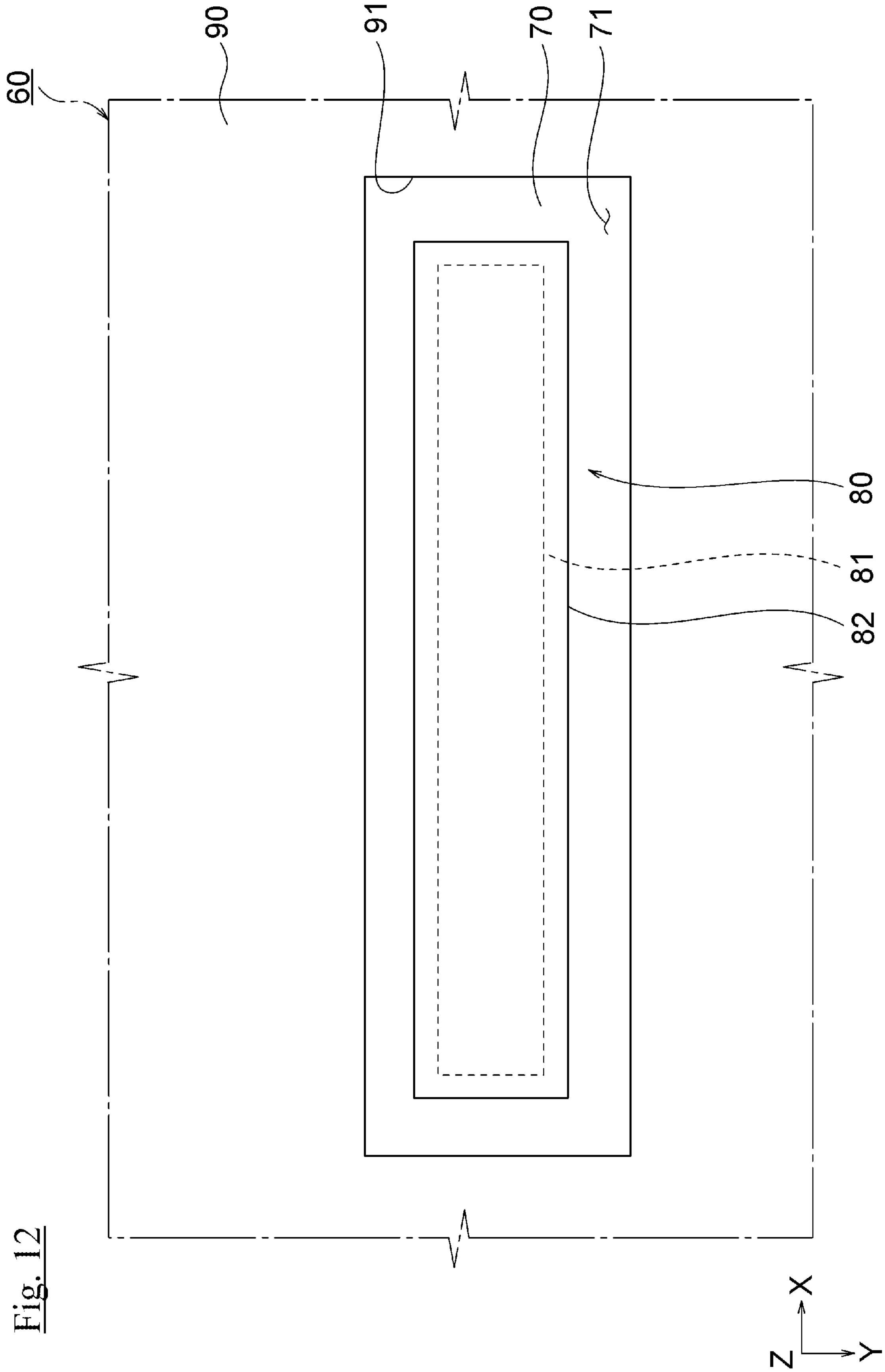
FIG. 12 is a bottom view showing the spacer and the upper membrane board according to one or more embodiments of the present invention.

FIG. 8 is a plan view showing the variable resistor in one or more embodiments of the present invention, FIG. 9 is a cross-sectional view showing the line IX-IX of FIG. 8, and FIG. 10 is a cross-sectional view taken along the line X-X of FIG. 8. FIG. 11 is a plan view showing the lower membrane board in one or more embodiments of the present invention, and FIG. 12 is a bottom view showing the spacer and the upper membrane board in one or more embodiments of the present invention.

As shown in FIGS. 8 to 12, although the variable resistor 1B of one or more embodiments is different from the variable resistor 1A of one or more embodiments described above in the points where (1) the spacer 90 covers the resistor 40 and the wiring pattern 50, (2) the connecting body 80 does not overlap the resistor 40 and the wiring pattern 50, and (3) the variable resistor 1B includes comb tooth patterns 45 and 55, other configurations of the variable resistor 1B are the same as one or more embodiments described above. Hereinafter, the variable resistor 1B in one or more embodiments will be described only with respect to the differences from the embodiments described above, and the same components as those in the embodiments described above will be denoted by the same reference numerals, and descriptions thereof will be omitted.

In one or more embodiments, the width of the resistor 40 is narrower as compared with in one or more embodiments described above. Further, the width of the connecting body 80 is also narrower, the entire connecting body 80 is located between the resistor 40 and the wiring pattern 50, and the entire area of the connecting body 80 is the non-overlap region NA. The width of the opening 91 of the spacer 90 is narrower than the distance D between the resistor 40 and the wiring pattern 50 (refer to FIG. 11). Therefore, the entire resistor 40 is covered with the spacer 90, and the entire first protective layer 52 of the wiring pattern 50 is also covered with the spacer 90. Further, in plan view, the connecting body 80 does not overlap with the resistor 40 and does not overlap with the wiring pattern 50. Similarly to the embodiments described above, in one or more embodiments, the sliding region SA of the slider 100 is also set between the resistor 40 and the wiring pattern 50 in a plan view, is included in the non-overlap region NA of the connecting body 80, and does not overlap with the resistor 40 and the wiring pattern 50.

Therefore, in one or more embodiments, as shown in FIG. 11, a plurality of (10 in this example) comb tooth patterns **45*a* to 45*j* and a plurality of (9 in this example) comb tooth patterns 55*a* to 55*i* are disposed on the upper surface 21 of the substrate 20 of the lower membrane board 10 in addition to the wiring patterns 31 and 35, the resistor 40, and the wiring pattern 50. In one or more embodiments, the comb tooth patterns 45*a* to 45*j* are collectively referred to as "comb tooth pattern 45", and the comb tooth patterns 55*a* to 55*i* are collectively referred to as "comb tooth pattern 55**".

Similarly to the wiring patterns 31 and 35, each of the comb tooth patterns **45*a* to 45*j* and 55*a* to 55*i* is formed by printing and curing the low-resistance conductive paste. That is, each of the comb tooth patterns 45*a* to 45*j* and 55*a* to 55*i* is made of a material having the lower electrical resistivity than the electrical resistivity of the material constituting the resistor 40, and the resistance value of the resistor 40 is sufficiently higher than the resistance value of each of the comb tooth patterns 45***a* to 45*j* and 55*a* to 55*i* to the extent that the resistance value of each of the comb tooth patterns 45*a* to 45*j* and 55*a* to 55*i* can be ignored. Specifically, the resistance value of the resistor 40 is 10 times or more with respect to the resistance value of each of the comb tooth patterns 45*a* to 45*j* and 55*a* to 55*i*, and may be 100 times or more with respect to the resistance value of each of the comb tooth patterns 45*a* to 45*j* and 55*a* to 55*i*. The electrical resistivity of the material constituting the resistor 40 is 10 times or more, and may be 100 times or more, with respect to the electrical resistivity of the material constituting each of the comb tooth patterns 45*a* to 45*j* and 55*a* to 55*i*.

The comb tooth patterns 45*b* to 45*i* in the present embodiment corresponds to an example of the "first comb tooth patterns" in one or more embodiments of the present invention, the comb tooth patterns 55*a* to 55*i* in the present embodiment corresponds to an example of the "second comb tooth patterns" in one or more embodiments of the present invention, the comb tooth patterns 45*a* in the present embodiment corresponds to an example of the "third comb tooth pattern" in one or more embodiments of the present invention, and the comb tooth patterns 45*j* in the present embodiment corresponds to an example of the "fourth comb tooth pattern" in one or more embodiments of the present invention.

As shown in FIG. 11, the comb tooth pattern 45*a* at the left end of the figure is branched from the wiring pattern 31 and protrudes along the Y direction of the figure. That is, the comb tooth pattern 45*a* is connected to the wiring pattern 31 and extends below the sliding region SA. Similarly, the comb tooth pattern 45*j* at the right end of the figure is branched from the wiring pattern 35 and protrudes along the Y direction of the figure. That is, the comb tooth pattern 45*j* is connected to the wiring pattern 35 and extends below the sliding region SA.

On the other hand, the eight comb tooth patterns 45*b* to 45*i* that are between the comb tooth patterns 45*a* and 45*j* at the both ends are electrically connected to the resistor 40 by embedding the ends of the comb tooth patterns 45*b* to 45*i* in the resistor 40. Then, these comb tooth patterns 45*b* to 45*i* protrude from the resistor 40 toward the wiring pattern 50. That is, the comb tooth patterns 45*b* to 45*i* are connected to the resistor 40 and extend below the sliding region SA. The comb tooth patterns 45*a* and 45*j* at the both ends may not be branched from the wiring patterns 31 and 35, but may be embedded in the resistor 40 in the same manner as the comb tooth patterns 45*b* to 45*i*.

Each of the comb tooth patterns 45*a* to 45*j* extends along the Y direction of the figure. The plurality of comb tooth patterns 45*a* to 45*j* are arranged substantially in parallel. Further, the plurality of comb tooth patterns 45*a* to 45*j* are arranged at substantially equal intervals.

Further, each of the comb tooth patterns 55*a* to 55*i* is branched from the first main body 51 of the wiring pattern 50, extends along the Y direction of the figure, and protrudes from the wiring pattern 50 toward the resistor 40. That is, each of the comb tooth patterns 55*a* to 55*i* is connected to the wiring pattern 50 and extends below the sliding region SA. The plurality of comb tooth patterns 55*a* to 55*i* are arranged at substantially equal intervals.

As shown in FIG. 8, all of the comb tooth patterns 45*a* to 45*j* and 55*a* to 55*i* face the connection body 80 through the opening 91 of the spacer 90 and overlap with the sliding area SA of the slider 100 in a plan view. Further, as shown in FIGS. 8 to 10, in a plan view, the comb tooth patterns 45*a* to 45*j* and the comb tooth patterns 55*a* to 55*i* are arranged alternately along the X direction of the figure and substantially at equal intervals.

The number of comb tooth patterns 45 is not particularly limited to the above. Similarly, the number of comb tooth patterns 55 is not particularly limited to the above. Further, the arrangement of the comb tooth patterns 45 and 55 is not particularly limited to the above. As will be described later, as the number of comb tooth patterns 45 and 55 increases, the output resolution of the variable resistor 1B can be increased.

In one or more embodiments, since the width of the resistor 40 is narrow as described above, as shown in FIG. 8, the resistor 40 has a narrower width W1 than the width W2 of the pushing portion 110 of the slider 100 (W1<W2). Here, when the slider slides directly above the resistor as in the conventional technique described above, since it is necessary to wider the resistor than the pushing portion of the slider in consideration of the displacement or the like of the trajectory of the slider, it is difficult to increase the resistance. On the other hand, in one or more embodiments, since the width of the resistor 40 can be narrowed, it is possible to easily increase the resistance of the resistor 40. In one or more embodiments described above, the width of the resistor 40 may be narrower than the width of the pushing portion 110 of the slider 100.

In one or more embodiments, as shown in FIG. 9, the pushing portion 110 of the slider 100 has a dimension S1 larger than the pitch P1 of the first comb tooth patterns 45 adjacent to each other via the second comb tooth pattern 55 in the direction (X direction of the figure) in which the first and second comb tooth patterns 45 and 55 are arranged (S1>P1). Although not particularly limited, the dimension S1 of the pushing portion 110 may be 50 times or less the pitch P1 of the first comb tooth pattern 45 (S1≤10×P1).

As shown in FIGS. 9 and 10, the substrate 70 of the upper membrane board 60 is bent downward due to pushing of the slider 100, and the connecting body 80 contact the comb tooth patterns 45 and 55 adjacent to each other. Therefore, the resistor 40 and the wiring pattern 50 are electrically connected via the connecting body 80. Specifically, in the state shown in FIG. 9, the comb tooth patterns 45*f* of the comb tooth patterns 45*a* to 45*j* and the comb tooth patterns 55*e* of the comb tooth patterns 55*a* to 55*i* are electrically connected to each other via the connecting body 80.

The number of comb tooth patterns 45*a* to 45*j* simultaneously connected to the connecting body 80 by pushing of the slider 100 may be plural. Similarly, the number of comb tooth patterns 55*a* to 55*i* simultaneously connected to the connecting body 80 by pushing of the slider 100 may be plural.

In one or more embodiments, as the slider 100 slides while pushing the upper membrane board 60, the combination of the comb tooth patterns 45 and 55 connected via the connecting body 80 is changed sequentially, and the resistance length (resistance value) of the resistor 40 is changed.

For example, in the state shown in FIG. 9, as described above, the comb tooth patterns 55*e* and 45*f* are connected via the connecting body 80. As the slider 100 slides in the +X direction of the figure from this state, the combinations of comb tooth patterns connected via the connecting body 80 is changed to the comb tooth patterns 55*e* and 45*f* the comb tooth patterns 45*f* and 55*f* the comb tooth patterns 55*f* and 45*g* the comb tooth patterns 45*g* and 55*g* the comb tooth patterns 55*g* and 45*h* the comb tooth patterns 45*i* and 55*i* the comb tooth patterns 55*i* and 45*j*.

Along with this, the wiring pattern 50 connected to the comb tooth patterns 55*a* to 55*i* detects a voltage (detection voltage) corresponding to the combination of the comb tooth patterns 45 and 55 connected via the connecting body 80. That is, also in one or more embodiments, the resistance value between the wiring patterns 31 and 50 is changed in accordance with the pushing position of the slider 100. When the slider 100 slides in the +X direction of the figure, the resistance value between the wiring patterns 31 and 50 gradually increases as the slider 100 slides. A multimeter or the like is connected to the wiring patterns 31 and 50 of the variable resistor 1B, and the multimeter or the like outputs the electric potential difference between the power supply voltage and the detection voltage of the wiring pattern 50.

On the other hand, as the slider 100 slides in the −X direction of the figure from the state shown in FIG. 9, the combinations of comb tooth patterns connected via the connecting body 80 is changed to the comb tooth patterns 45*f* and 55*e* the comb tooth patterns 55*e* and 45*e* the comb tooth patterns 45*e* and 55*d* the comb tooth patterns 55*d* and 45*d* the comb tooth patterns 45*d* and 55*c* the comb tooth patterns 45*b* and 55*a* the comb tooth patterns 55*a* and 45*a*. In this case, the resistance value between the wiring patterns 31 and 50 gradually decreases as the slider 100 slides.

For example, when the comb tooth patterns 45*a* and 55*a* that are the leftmost combination of FIG. 9 are connected via the connecting body 80, the wiring pattern 50 detects a voltage of substantially the same potential as the power supply voltage, and the multimeter or the like outputs the electric potential difference (for example, 0 [V]) between the power supply voltage and the detected voltage of the wiring pattern 50.

On the other hand, as shown in FIG. 9, when the comb tooth patterns 55*e* and 45*f* that are substantially central combinations are connected via the connecting body 80, the wiring pattern 50 detects the voltage having a potential of substantially half of the power supply voltage, and the multimeter or the like outputs the electric potential difference (for example, 2.5 [V]) between the power supply voltage and the detected voltage of the wiring pattern 50.

Further, when the comb tooth patterns 55*i* and 45*j* that are the rightmost combination of FIG. 9 are connected via the connecting body 80, the wiring pattern 50 detects a voltage of substantially the same potential as ground, and the multimeter or the like outputs the electric potential difference (for example, 5 [V]) between the power supply voltage and the detected voltage of the wiring pattern 50.

Thus, in one or more embodiments, since the resistance value between the wiring patterns 31 and 50 is changed in accordance with the combination of the comb tooth patterns 45 and 55 connected via the connecting body 80, the output of the variable resistor 1B has a stepped shape. Therefore, as the number of comb patterns 45 and 55 is increased and the pitch of the comb pattern 45 and 55 is narrower, the resolution of the output of the variable resistor 1B can be heightened.

As described above, in one or more embodiments, the connecting body 80 is disposed on the lower surface 71 of the substrate 70 of the upper membrane board 60, the slider 100 pushes the upper surface 72 of the substrate 70, and the resistor 40 and the wiring pattern 50 respectively connected to the comb tooth patterns 45 and 55 are electrically connected by connecting the comb tooth patterns 45 and 55 via the connecting body 80. That is, the substrate 70 of the upper membrane board 60 is interposed between the slider 100 and the resistor 40, and the slider 100 does not directly contact the resistor 40.

Further, in one or more embodiments, the sliding region SA in which the slider 100 slides is set between the resistor 40 and the wiring pattern 50 in a plan view. That is, there is no resistor 40 immediately below the sliding region SA of the slider 100.

Therefore, in one or more embodiments, since it is possible to suppress wear of the resistor 40 due to sliding of the slider 100, it is possible to suppress the occurrence of conduction failure of the variable resistor 1B.

Further, in one or more embodiments, the comb tooth patterns 45*b* to 45*i* protruding from the resistor 40 contact the connecting body 80, and the resistor 40 itself does not directly contact the connecting body 80. Further, in one or more embodiments, the entire area of the resistor 40 is covered with the spacer 90 and is protected by the spacer 90. Therefore, in one or more embodiments, wear of the resistor 40 does not occur in the first place.

Further, in one or more embodiments, the sliding region SA of the slider 100 overlaps with the comb tooth patterns 45*b* to 45*i* protruding from the resistor 40, and the sliding region SA does not overlap with the resistor 40 itself. Therefore, since the sliding region SA of the slider 100 is not limited by the thick end portion of the resistor 40 due to the overlap with the wiring patterns 31 and 35, it is possible to use the entire area of the resistor 40 as a detectable range of the variable resistor 1B.

Further, in one or more embodiments, the leftmost comb tooth pattern 45*a* of FIG. 9 is connected to one wiring pattern 31, and the rightmost comb tooth pattern 45*j* of FIG. 9 is connected to the other wiring pattern 35. Therefore, the maximum value of the output of the variable resistor 1B can be made equal to the power supply voltage, and the minimum value of the output of the variable resistor 1B can be made equal to the ground.

Further, similarly to embodiments described above, in one or more embodiments, since all of the wiring patterns 31, 35, and 50 to be connected to the outside are disposed on the upper surface 21 of the same substrate 20, it is sufficient to implement a connector only on the upper surface 21, and it is possible to simplify the configuration of the variable resistor 1B.

Embodiments heretofore explained are described to facilitate understanding of the present invention and are not described to limit the present invention.

For example, the configuration of one or more embodiments described above may be combined.

Figure 13:
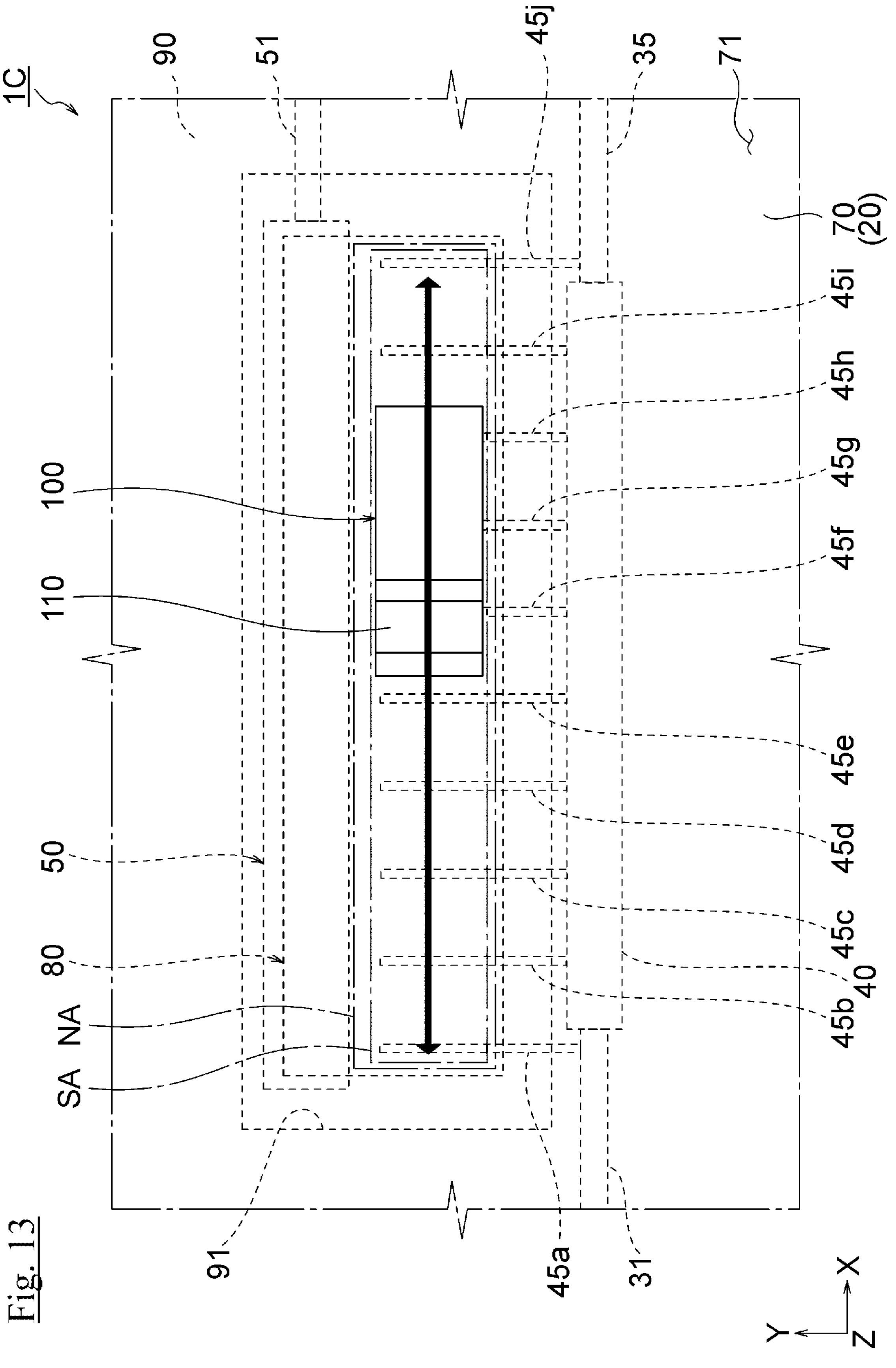
FIG. 13 is a plan view showing the variable resistor according to one or more embodiments of the present invention.

Specifically, as in the variable resistor 1C shown in FIG. 13, similarly to embodiments described above, the comb tooth patterns 45 may be projected from the resistor 40 to overlap the connection body 80 with the comb tooth patterns 45, and the other edge 80*b* of the connecting body 80 may overlap with the wiring pattern 50, similarly to one or more embodiments described above. FIG. 13 is a plan view showing the variable resistor in one or more embodiments of the present invention.

Also in this case, similarly to one or more embodiments described above, the resistor 40 itself does not contact the connection 80, and the entire area of the resistor 40 is protected by the spacer 90. Therefore, since wear of the resistor 40 due to sliding of the slider 100 does not occur in the first place, it is possible to suppress the occurrence of conduction failure of the variable resistor 1C.

Figure 14:
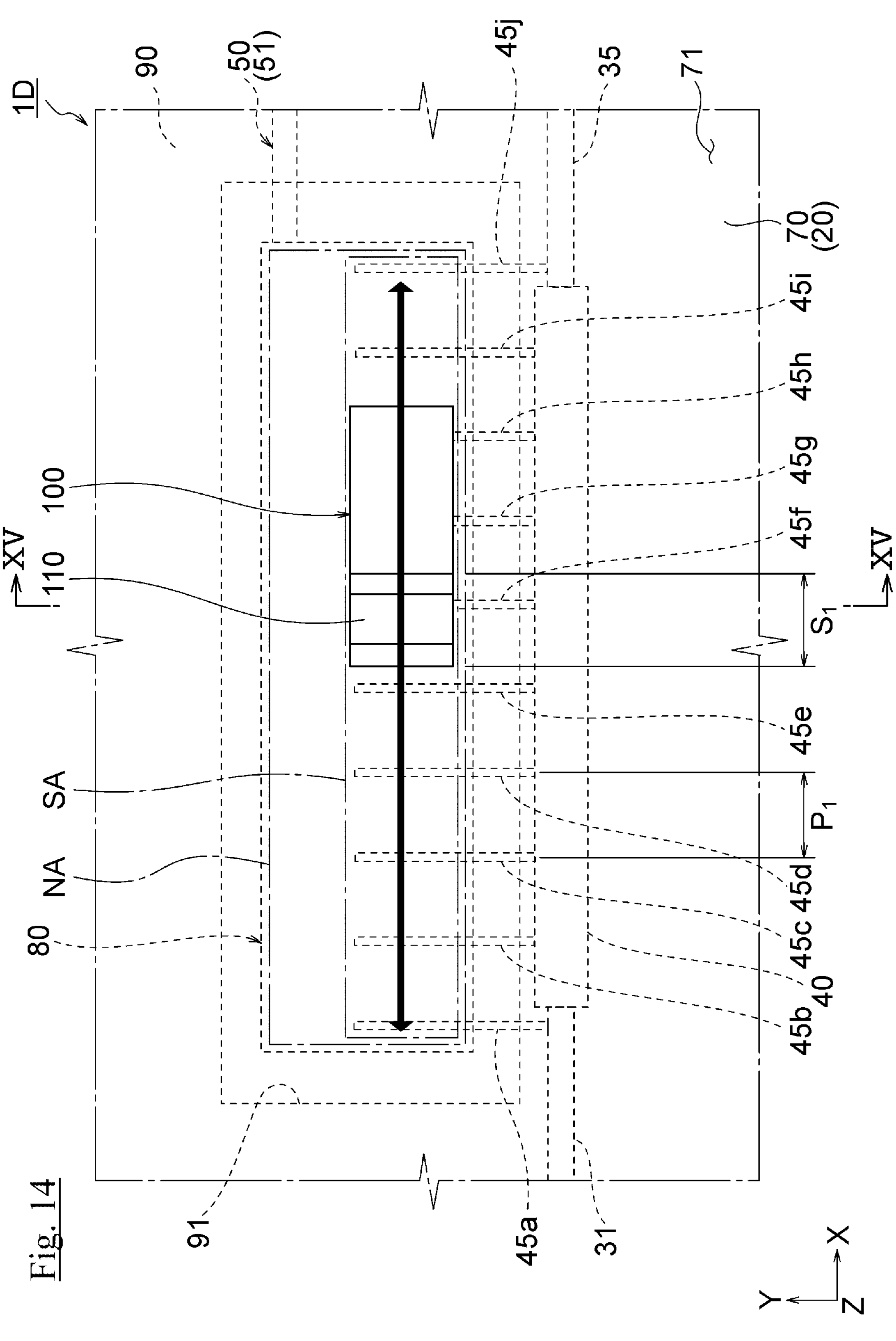
FIG. 14 is a plan view showing the variable resistor according to one or more embodiments of the present invention.
Figure 15:
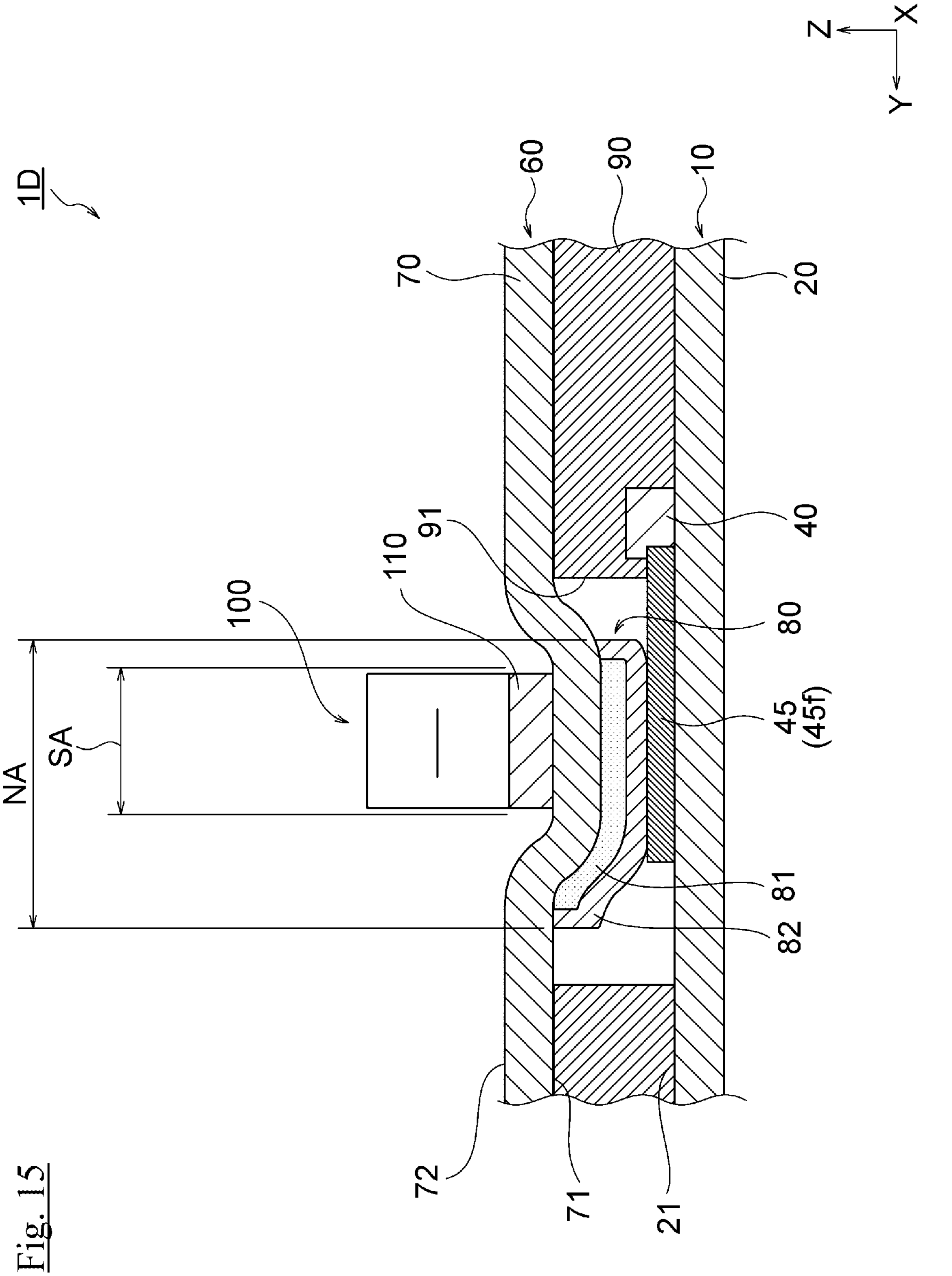
FIG. 15 is a cross-sectional view taken along the line XV-XV of FIG. 14.
Figure 16:
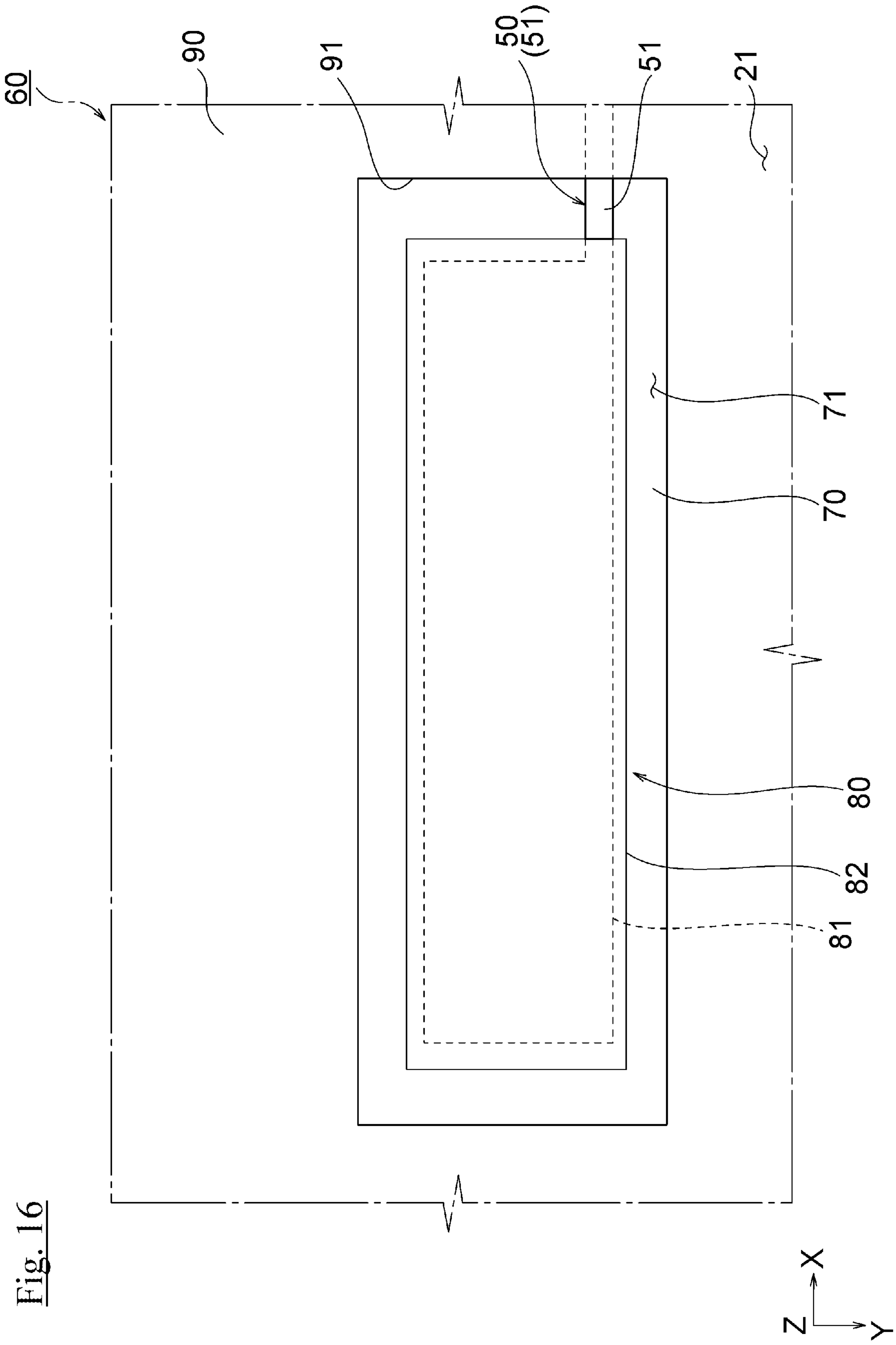
FIG. 16 is a bottom view illustrating the spacer and the upper membrane board according to one or more embodiments of the present invention.

Alternatively, as in the variable resistor 1D shown in FIGS. 14 to 16, the wiring pattern 50 may be disposed on the upper substrate 70 and may be directly connected to the connecting body 80. FIG. 14 is a plan view showing the variable resistor in one or more embodiments of the present invention, FIG. 15 is a cross-sectional view taken along the line XV-XV of FIG. 14, and FIG. 16 is a bottom view illustrating the spacer and the upper membrane board in one or more embodiments of the present invention.

Specifically, the variable resistor 1D shown in FIGS. 14 to 16 is different from the above-mentioned variable resistor 1C shown in FIG. 13 in the points where, instead of forming the wiring pattern 50 on the upper surface 21 of the lower substrate 20, the wiring pattern 50 is formed on the lower surface 72 of the upper substrate 70 and the wiring pattern 50 is directly connected to the connecting body 80. In this case, as shown in FIG. 16, the wiring pattern 50 includes the first main body 51 only, and the first main body 51 is connected to the second main body 81 of the connecting body 80.

In one or more embodiments, as shown in FIG. 14, the pushing portion 110 of the slider 100 has a dimension 51 larger than the pitch P1 of the first comb tooth patterns 45 adjacent to each other in the direction (X direction of the figure) in which the first comb tooth patterns 45 are arranged (S1>P1). Although not particularly limited, the dimension 51 of the pushing portion 110 may be 50 times or less the pitch P1 of the first comb tooth pattern 45 (S1≤10×P1).

Figure 17:
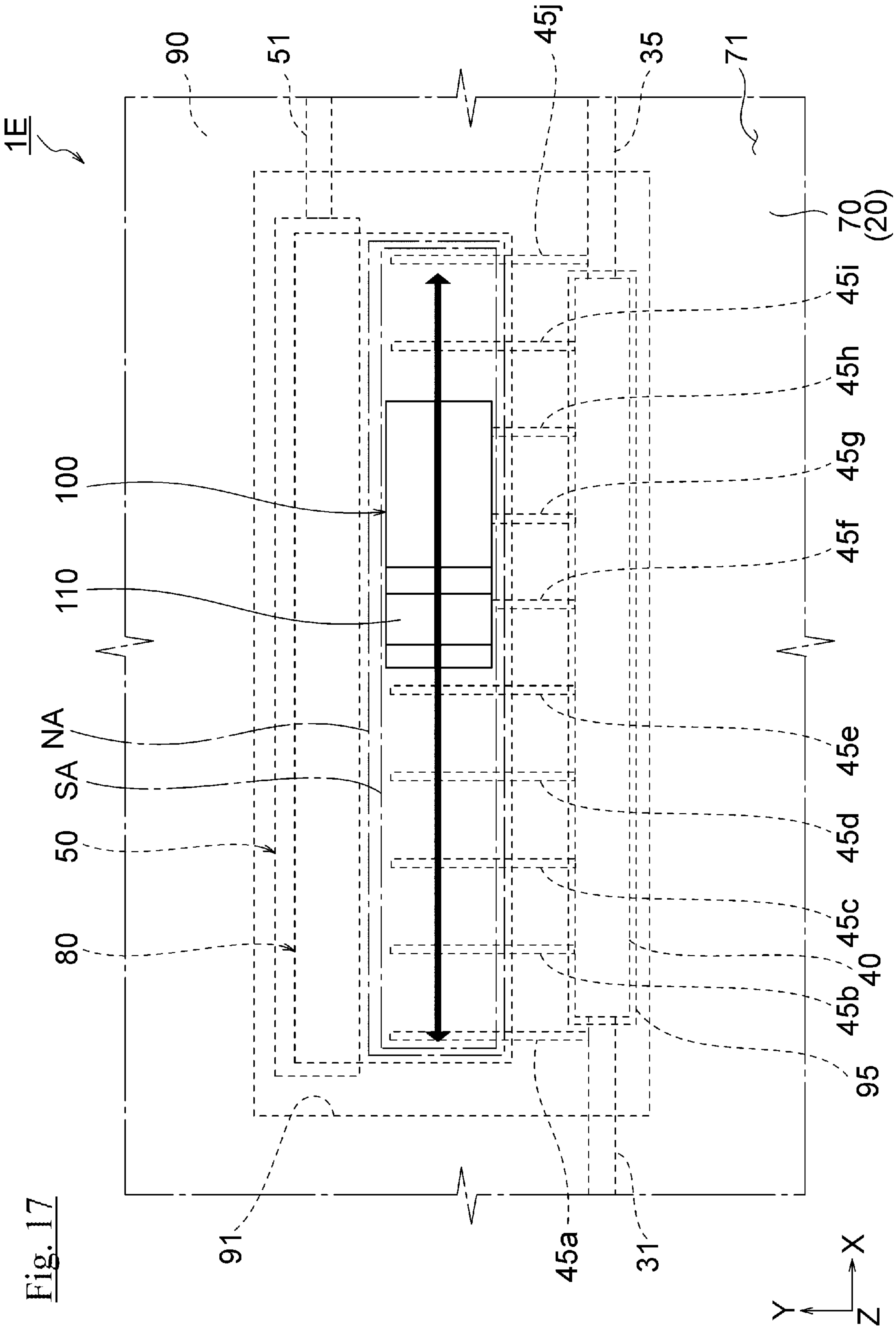
FIG. 17 is a plan view showing the variable resistor according to one or more embodiments of the present invention.

Alternatively, as in the variable resistor 1E shown in FIG. 17, the resistor 40 may be covered with a resin layer 95 different from the spacer 90. FIG. 17 is a plan view showing the variable resistor in one or more embodiments of the present invention.

Specifically, the variable resistor 1E shown in FIG. 17 is different from the above-mentioned variable resistor 1C shown in FIG. 13 in the points where, instead of covering the resistor 40 with the spacer 90, the opening 91 of the spacer 90 has a size that does not include the resistor 40 and the resistor 40 is covered with a resin layer 95 such as a resist in order to protect the resistor 40. The spacer 90 may partially cover the resistor 40 and the resin layer 93 may partially cover the resistor 40, thereby the spacer 90 and the resin layer 95 may cover the entire resistor 40.

In one or more embodiments described above, although the comb tooth patterns 45 and 55 are disposed between the resistor 40 and the wiring pattern 50, the arrangement of the comb tooth patterns 45 and 55 is not particularly limited thereto. For example, the connection body 80 may be disposed at a position away from the resistor 40 and the wiring pattern 50 without disposing the connection body 80 between the resistor 40 and the wiring pattern 50, and the comb teeth patterns 45 and 55 may be led out to below the connecting body 80.

Further, in one or more embodiments described above, although, regarding the operation of the slider 100, it is described that the slider 100 that contacts and pushes the upper surface 72 of the upper membrane board 60 slides (reciprocates) along the X direction of the figure, the operation of the slider 100 is not particularly limited thereto.

For example, the slider 100 may repeat the operation of pushing rising horizontal moving pushing rising horizontal moving. Specifically, it may be repeated the operation where the slider 100 contacts and pushes one point on the upper surface 72 of the upper membrane board 60, then rises without sliding on the upper surface 72, then horizontally moves in the X direction (extending direction (longitudinal direction) of the connecting body 80) of the figure, and then contacts and pushes the other point on the upper surface 72 of the upper membrane board 60. Also in this case, the resistance length of the resistor 40 (resistance value) is changed in accordance with pushing of the slider 100 at different points, and different voltages is output from the wiring pattern 50.

In one or more embodiments described above, although the operation of the variable resistor 1A' was performed by the slider 110 included in the variable resistor 1A~1E itself, the operation of the variable resistor is not particularly limited thereto. For example, instead of the slider 100, an operator may operate the variable resistor by a finger.

In one or more embodiments, although the resistance value of the variable resistor 1A~1E is detected by connecting the wiring pattern 31 to the power supply, connecting the wiring pattern 35 to ground, and acquiring the detected voltage of the wiring pattern 50, the circuit configuration for detecting the resistance value of the variable resistor is not particularly limited thereto.

For example, the power supply may be connected to the wiring patterns 31 and 50 without providing the wiring pattern 35. Also in this case, the resistance value between the wiring patterns 31 and 50 is changed in accordance with the pushing position of the slider 100.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATIONS OF LETTERS OR NUMERALS

1A to 1E . . . Variable resistor
10 . . . Lower membrane board
20 . . . Substrate
21 . . . Upper surface
31 . . . Wiring pattern
32 . . . Extending portion
33 . . . Wide portion
35 . . . Wiring pattern
36 . . . Extending portion
37 . . . Wide portion
40 . . . Resistor
45, 45*a* to 45*j* . . . Comb tooth pattern
50 . . . Wiring pattern
51 . . . First main body
511 . . . Parallel portion
52 . . . First protective layer
55, 55*a* to 55*i* . . . Comb tooth pattern
60 . . . Upper membrane board
70 . . . Substrate
71 . . . Lower surface
72 . . . Upper surface
80 . . . Connecting body
80*a*, 80*b* . . . Edge
81 . . . Second main body
82 . . . Second protective layer
90 . . . Spacer
91 . . . Opening
95 . . . Resin layer
100 . . . Slider
110 . . . Pushing portion
NA . . . Non-overlap region
SA . . . Sliding region

The invention claimed is:

1. A variable resistor, comprising:

a first substrate having a first main surface;

a resistor disposed on the first main surface;

a first wiring pattern disposed on the first main surface and connected to the resistor;
a spacer having an opening;
a second substrate that:
has second and third main surfaces, and
is disposed on the first substrate via the spacer such that the second main surface is opposed to the first main surface;
a connecting body that is:
disposed on the second main surface such that the connecting body is disposed in the opening, and
configured to electrically connect to the resistor by pushing of a pusher from the third main surface; and
a second wiring pattern that is either:
disposed on the first main surface and configured to be electrically connected to the connecting body by the pushing of the pusher; or
disposed on the second main surface and connected to the connecting body, wherein
in a plan view, the connecting body has a non-overlap region that does not overlap with the resistor,
in a plan view, a pushing region in which the pusher can push is included in the non-overlap region, and
a resistance value between the first wiring pattern and the second wiring pattern is changed based on a pushing position of the pusher,
in a plan view, the connecting body partially overlaps with the resistor,
in a plan view, the pushing region does not overlap with the resistor, and
the connecting body contacts the resistor by the pushing of the pusher from the third main surface.

2. A variable resistor, comprising:
a first substrate having a first main surface;
a resistor disposed on the first main surface;
a first wiring pattern disposed on the first main surface and connected to the resistor;
a spacer having an opening;
a second substrate that:
has second and third main surfaces, and
is disposed on the first substrate via the spacer such that the second main surface is opposed to the first main surface;
a connecting body that is:
disposed on the second main surface such that the connecting body is disposed in the opening, and
configured to electrically connect to the resistor by pushing of a pusher from the third main surface; and
a second wiring pattern that is either:
disposed on the first main surface and configured to be electrically connected to the connecting body by the pushing of the pusher; or
disposed on the second main surface and connected to the connecting body, wherein
in a plan view, the connecting body has a non-overlap region that does not overlap with the resistor,
in a plan view, a pushing region in which the pusher can push is included in the non-overlap region,
a resistance value between the first wiring pattern and the second wiring pattern is changed based on a pushing position of the pusher,
the variable resistor further comprises first comb tooth patterns disposed on the first main surface and connected to the resistor,
in plan view, the first comb tooth patterns overlap with the pushing region,
a material of which the resistor is made has an electrical resistivity higher than an electrical resistivity of a material of which the first comb tooth patterns are made,
the second wiring pattern is disposed on the first main surface,
the variable resistor further comprises second comb tooth patterns disposed on the first main surface and connected to the second wiring pattern,
in a plan view, the second comb tooth patterns overlap with the pushing region,
a material of which the resistor is made has an electrical resistivity higher than an electrical resistivity of a material of which the second comb tooth patterns are made, and
the connecting body contacts the first comb tooth pattern and the second comb tooth pattern by the pushing of the pusher from the third main surface.

3. The variable resistor according to claim 2, wherein
the first comb tooth patterns and the second comb tooth patterns are arranged alternately and substantially at equal intervals along an extending direction of the connecting body in the pushing region, and
a pushing portion of the pusher that contacts the third surface has a dimension larger than a pitch of the first comb tooth patterns adjacent to each other via the second comb tooth pattern in a direction in which the first and second comb tooth patterns are arranged.

4. A variable resistor, comprising:
a first substrate having a first main surface;
a resistor disposed on the first main surface;
a first wiring pattern disposed on the first main surface and connected to the resistor;
a spacer having an opening;
a second substrate that:
has second and third main surfaces, and
is disposed on the first substrate via the spacer such that the second main surface is opposed to the first main surface;
a connecting body that is:
disposed on the second main surface such that the connecting body is disposed in the opening, and
configured to electrically connect to the resistor by pushing of a pusher from the third main surface; and
a second wiring pattern that is either:
disposed on the first main surface and configured to be electrically connected to the connecting body by the pushing of the pusher; or
disposed on the second main surface and connected to the connecting body, wherein
in a plan view, the connecting body has a non-overlap region that does not overlap with the resistor,
in a plan view, a pushing region in which the pusher can push is included in the non-overlap region,
a resistance value between the first wiring pattern and the second wiring pattern is changed based on a pushing position of the pusher,
the variable resistor further comprises first comb tooth patterns disposed on the first main surface and connected to the resistor,
in plan view, the first comb tooth patterns overlap with the pushing region,
a material of which the resistor is made has an electrical resistivity higher than an electrical resistivity of a material of which the first comb tooth patterns are made, the second wiring pattern is disposed on the first main surface, in plan view, the connecting body partially overlaps with the second wiring pattern, and the connecting body contacts the first comb tooth patterns and the second wiring pattern by the pushing of the pusher from the third main surface.

5. The variable resistor according to claim 4, wherein the first comb tooth patterns are arranged substantially at equal intervals along an extending direction of the connecting body in the pushing region, and a pushing portion of the pusher that contacts the third surface has a dimension larger than a pitch of the first comb tooth patterns adjacent to each other in a direction in which the first comb tooth patterns are arranged.

6. A variable resistor, comprising:

a first substrate having a first main surface;

a resistor disposed on the first main surface;

a first wiring pattern disposed on the first main surface and connected to the resistor;

a spacer having an opening;

a second substrate that:

has second and third main surfaces, and is disposed on the first substrate via the spacer such that the second main surface is opposed to the first main surface;

a connecting body that is:

disposed on the second main surface such that the connecting body is disposed in the opening, and configured to electrically connect to the resistor by pushing of a pusher from the third main surface; and a second wiring pattern that is either:

disposed on the first main surface and configured to be electrically connected to the connecting body by the pushing of the pusher; or disposed on the second main surface and connected to the connecting body, wherein in a plan view, the connecting body has a non-overlap region that does not overlap with the resistor, in a plan view, a pushing region in which the pusher can push is included in the non-overlap region, a resistance value between the first wiring pattern and the second wiring pattern is changed based on a pushing position of the pusher, the variable resistor further comprises first comb tooth patterns disposed on the first main surface and connected to the resistor, in plan view, the first comb tooth patterns overlap with the pushing region, a material of which the resistor is made has an electrical resistivity higher than an electrical resistivity of a material of which the first comb tooth patterns are made, the variable resistor further comprises:

a third wiring pattern connected to the resistor;

a third comb tooth pattern connected to the first wiring pattern; and a fourth comb tooth pattern connected to the third wiring pattern, and in a plan view, the third and fourth comb tooth patterns overlap with the pushing region.

7. The variable resistor according to claim 2, wherein the spacer covers the whole resistor.

8. A variable resistor, comprising:

a first substrate having a first main surface;

a resistor disposed on the first main surface;

a first wiring pattern disposed on the first main surface and connected to the resistor;

a spacer having an opening;

a second substrate that:

has second and third main surfaces, and is disposed on the first substrate via the spacer such that the second main surface is opposed to the first main surface;

a connecting body that is:

disposed on the second main surface such that the connecting body is disposed in the opening, and configured to electrically connect to the resistor by pushing of a pusher from the third main surface; and a second wiring pattern that is either:

disposed on the first main surface and configured to be electrically connected to the connecting body by the pushing of the pusher; or disposed on the second main surface and connected to the connecting body, wherein in a plan view, the connecting body has a non-overlap region that does not overlap with the resistor, in a plan view, a pushing region in which the pusher can push is included in the non-overlap region, a resistance value between the first wiring pattern and the second wiring pattern is changed based on a pushing position of the pusher, the variable resistor further comprises first comb tooth patterns disposed on the first main surface and connected to the resistor, in plan view, the first comb tooth patterns overlap with the pushing region, a material of which the resistor is made has an electrical resistivity higher than an electrical resistivity of a material of which the first comb tooth patterns are made, the variable resistor further comprises a resin layer covering at least a part of the resistor, and at least one of the resin layer and the spacer covers the whole resistor.

9. The variable resistor according to claim 2, wherein the resistor has a width narrower than a width of a pushing portion of the pusher that contacts the third main surface.

10. A variable resistor, comprising:

a first substrate having a first main surface;

a resistor disposed on the first main surface;

a first wiring pattern disposed on the first main surface and connected to the resistor;

a spacer having an opening;

a second substrate that:

has second and third main surfaces, and is disposed on the first substrate via the spacer such that the second main surface is opposed to the first main surface;

a connecting body that is:

disposed on the second main surface such that the connecting body is disposed in the opening, and configured to electrically connect to the resistor by pushing of a pusher from the third main surface; and a second wiring pattern that is either:

disposed on the first main surface and configured to be electrically connected to the connecting body by the pushing of the pusher; or disposed on the second main surface and connected to the connecting body, wherein in a plan view, the connecting body has a non-overlap region that does not overlap with the resistor, in a plan view, a pushing region in which the pusher can push is included in the non-overlap region, a resistance value between the first wiring pattern and the second wiring pattern is changed based on a pushing position of the pusher, the variable resistor further comprises first comb tooth patterns disposed on the first main surface and connected to the resistor, in plan view, the first comb tooth patterns overlap with the pushing region, a material of which the resistor is made has an electrical resistivity higher than an electrical resistivity of a material of which the first comb tooth patterns are made, the second wiring pattern is disposed on the second main surface and is connected to the connecting body, the connecting body contacts the first comb tooth pattern by the pushing of the pusher from the third main surface, the first comb tooth patterns are arranged substantially at equal intervals along an extending direction of the connecting body in the pushing region, and a pushing portion of the pusher that contacts the third surface has a dimension larger than a pitch of the first comb tooth patterns adjacent to each other in a direction in which the first comb tooth patterns are arranged.

* * * * *